US011321772B2

(12) United States Patent
Amtrup et al.

(10) Patent No.: US 11,321,772 B2
(45) Date of Patent: *May 3, 2022

(54) SYSTEMS AND METHODS FOR IDENTIFICATION DOCUMENT PROCESSING AND BUSINESS WORKFLOW INTEGRATION

(71) Applicant: Kofax, Inc., Irvine, CA (US)

(72) Inventors: Jan W. Amtrup, Silver Spring, MD (US); Steven Kilby, Rancho Santa Margarita, CA (US); Anthony Macciola, Irvine, CA (US)

(73) Assignee: KOFAX, INC., Irvine, CA (US)

( * ) Notice: Subject to any disclaimer, the term of this patent is extended or adjusted under 35 U.S.C. 154(b) by 597 days.

This patent is subject to a terminal disclaimer.

(21) Appl. No.: 15/394,731

(22) Filed: Dec. 29, 2016

(65) Prior Publication Data

US 2017/0109818 A1    Apr. 20, 2017

Related U.S. Application Data

(63) Continuation of application No. 15/051,587, filed on Feb. 23, 2016, now abandoned, which is a
(Continued)

(51) Int. Cl.
*G06Q 50/18*    (2012.01)
*G06Q 40/02*    (2012.01)
(Continued)

(52) U.S. Cl.
CPC ....... *G06Q 40/025* (2013.01); *G06K 9/00442* (2013.01); *G06K 9/00449* (2013.01);
(Continued)

(58) Field of Classification Search
CPC ............ G06Q 40/025; G06Q 20/3223; G06Q 20/3276; G06Q 20/4014; G06Q 50/18;
(Continued)

(56) References Cited

U.S. PATENT DOCUMENTS 5,764,813 A  6/1998 Murayama et al.
6,075,905 A  6/2000 Herman et al.
(Continued)

OTHER PUBLICATIONS

U.S. Appl. No. 15/051,587, Claims filed Oct. 30, 2019 (Year: 2019).*
(Continued)

*Primary Examiner* — Scott C Anderson
*Assistant Examiner* — James H Miller
(74) *Attorney, Agent, or Firm* — Zilka-Kotab, P.C.

(57) ABSTRACT

A method includes: receiving or capturing an image comprising an identity document (ID) using a mobile device; classifying the ID; analyzing the ID based at least in part on the ID classification; determining at least some identifying information from the ID; at least one of building an ID profile and updating the ID profile, based at least in part on the analysis; providing at least one of the ID and the ID classification to a loan application workflow and/or a new financial account workflow; and driving at least a portion of the workflow based at least in part on the ID and the ID classification. Corresponding systems and computer program products are also disclosed.

1 Claim, 10 Drawing Sheets

Related U.S. Application Data continuation of application No. 14/220,016, filed on Mar. 19, 2014, now Pat. No. 9,483,794, which is a continuation-in-part of application No. 13/740,123, filed on Jan. 11, 2013, now Pat. No. 8,855,375.

(60) Provisional application No. 61/720,958, filed on Oct. 31, 2012, provisional application No. 61/586,062, filed on Jan. 12, 2012.

(51) Int. Cl.
| | | |
|---|---|---|
| *G06K 9/00* | (2022.01) | |
| *G06Q 20/32* | (2012.01) | |
| *G06Q 20/40* | (2012.01) | |
| *H04N 1/00* | (2006.01) | |

(52) U.S. Cl.
CPC ..... *G06K 9/00456* (2013.01); *G06K 9/00469* (2013.01); *G06Q 20/3223* (2013.01); *G06Q 20/3276* (2013.01); *G06Q 20/4014* (2013.01); *H04N 1/00106* (2013.01); *H04N 1/00251* (2013.01); *H04N 1/00334* (2013.01); *G06K 9/00463* (2013.01); *G06K 9/00483* (2013.01); *G06Q 50/18* (2013.01)

(58) Field of Classification Search
CPC ........... G06K 9/00442; G06K 9/00449; G06K 9/00456; G06K 9/00469; G06K 9/00463; G06K 9/00483; H04N 1/00106; H04N 1/00251; H04N 1/00334
See application file for complete search history.

(56) References Cited

U.S. PATENT DOCUMENTS

| | | |
|---|---|---|
| 6,278,798 B1 | 8/2001 | Rao |
| 6,281,928 B1 | 8/2001 | Umezaki et al. |
| 6,339,426 B1 | 1/2002 | Lui et al. |
| 6,647,139 B1 | 11/2003 | Kunii et al. |
| 6,778,297 B1 | 8/2004 | Fujiwara |
| 6,834,128 B1 | 12/2004 | Altunbasak et al. |
| 6,930,703 B1 | 8/2005 | Hubel et al. |
| 7,031,496 B2 | 4/2006 | Shimano et al. |
| 7,088,460 B2 | 8/2006 | Toyama et al. |
| 7,160,253 B2 | 1/2007 | Nissila |
| 7,403,310 B2 | 7/2008 | Miyagi et al. |
| 7,418,131 B2 | 8/2008 | Wang et al. |
| 7,539,344 B2 | 5/2009 | Eguchi et al. |
| 7,606,439 B2 | 10/2009 | Lefebure et al. |
| 7,695,143 B2 | 4/2010 | Kobayashi |
| 7,720,283 B2 | 5/2010 | Sun et al. |
| 7,746,356 B2 | 6/2010 | Meinders |
| 7,809,587 B2 | 10/2010 | Dorai et al. |
| 8,068,674 B2 | 11/2011 | Goncalves |
| 8,228,323 B2 | 7/2012 | Bandel et al. |
| 8,233,033 B2 | 7/2012 | Aarts et al. |
| 8,285,034 B2 | 10/2012 | Rajaraman et al. |
| 8,688,579 B1 | 4/2014 | Ethington et al. |
| 8,718,405 B2 | 5/2014 | Fujiki et al. |
| 8,879,839 B2 | 11/2014 | Ishida et al. |
| 8,897,565 B1 | 11/2014 | Palm et al. |
| 8,977,075 B2 | 3/2015 | Tytgat |
| 9,152,860 B2 | 10/2015 | Cervin et al. |
| 9,483,794 B2 * | 11/2016 | Amtrup .............. G06K 9/00442 |
| 9,674,505 B2 | 6/2017 | Wu et al. |
| 9,779,926 B2 | 10/2017 | Van Berkel et al. |
| 9,817,081 B2 | 11/2017 | Hahn et al. |
| 9,979,296 B2 | 5/2018 | Djenguerian et al. |
| 10,157,331 B1 | 12/2018 | Tang et al. |
| 10,354,159 B2 | 7/2019 | Savvides et al. |
| 10,635,712 B2 | 4/2020 | Macciola et al. |
| 10,657,600 B2 | 5/2020 | Macciola et al. |
| 10,664,919 B2 | 5/2020 | Macciola et al. |
| 10,699,146 B2 | 6/2020 | Shustorovich |
| 10,783,613 B2 | 9/2020 | Ma et al. |
| 10,783,615 B2 | 9/2020 | Ma et al. |
| 10,803,350 B2 | 10/2020 | Ma et al. |
| 11,062,163 B2 | 7/2021 | Thrasher et al. |
| 11,062,176 B2 | 7/2021 | Ma et al. |
| 11,087,407 B2 | 8/2021 | Macciola et al. |
| 2001/0043273 A1 | 11/2001 | Herrod et al. |
| 2002/0057838 A1 | 5/2002 | Steger |
| 2004/0111453 A1* | 6/2004 | Harris ................. G06K 9/6269 708/200 |
| 2004/0202349 A1 | 10/2004 | Erol et al. |
| 2005/0175243 A1* | 8/2005 | Luo ...................... G06K 9/6292 382/224 |
| 2005/0207622 A1 | 9/2005 | Haupt et al. |
| 2006/0017959 A1* | 1/2006 | Downer ................. G07D 7/004 358/1.14 |
| 2006/0020630 A1* | 1/2006 | Stager .................... G06Q 50/26 |
| 2006/0029276 A1* | 2/2006 | Nagahashi ......... G06K 9/00228 382/173 |
| 2006/0043264 A1 | 3/2006 | Sakurai |
| 2007/0058856 A1 | 3/2007 | Boregowda et al. |
| 2007/0094296 A1 | 4/2007 | Peters |
| 2007/0110417 A1 | 5/2007 | Itokawa |
| 2007/0237425 A1 | 10/2007 | Taguchi et al. |
| 2008/0013836 A1 | 1/2008 | Nakamura et al. |
| 2008/0031514 A1 | 2/2008 | Kakinami |
| 2008/0177764 A1 | 7/2008 | Kise et al. |
| 2008/0192991 A1 | 8/2008 | Gremse et al. |
| 2008/0278599 A1 | 11/2008 | Shiohara |
| 2009/0141940 A1 | 6/2009 | Zhao et al. |
| 2010/0060915 A1* | 3/2010 | Suzuki ................. G06K 9/4642 358/1.9 |
| 2010/0289797 A1 | 11/2010 | Tateno et al. |
| 2011/0116684 A1 | 5/2011 | Coffman et al. |
| 2011/0123120 A1 | 5/2011 | Quack |
| 2011/0175984 A1 | 7/2011 | Tolstaya et al. |
| 2011/0178708 A1 | 7/2011 | Zhang et al. |
| 2011/0179289 A1* | 7/2011 | Guenther ................. G06F 21/64 713/189 |
| 2011/0254942 A1 | 10/2011 | Suzuki |
| 2011/0312374 A1 | 12/2011 | Chen et al. |
| 2012/0002057 A1 | 1/2012 | Kakinami |
| 2012/0011142 A1 | 1/2012 | Baheti et al. |
| 2012/0051628 A1 | 3/2012 | Noguchi et al. |
| 2012/0087552 A1 | 4/2012 | Lee |
| 2012/0281077 A1 | 11/2012 | Canero Morales et al. |
| 2013/0044186 A1 | 2/2013 | Jin et al. |
| 2013/0051671 A1 | 2/2013 | Barton |
| 2013/0063788 A1 | 3/2013 | Iwayama et al. |
| 2013/0129248 A1 | 5/2013 | Doublet et al. |
| 2013/0155058 A1 | 6/2013 | Golparvar-Fard et al. |
| 2013/0155474 A1 | 6/2013 | Roach et al. |
| 2013/0215480 A1 | 8/2013 | Iwayama et al. |
| 2013/0216094 A1 | 8/2013 | DeLean |
| 2013/0287265 A1* | 10/2013 | Nepomniachtchi .. G06K 9/3275 382/115 |
| 2014/0086488 A1 | 3/2014 | Moteki et al. |
| 2014/0204204 A1 | 7/2014 | Sumiyoshi et al. |
| 2015/0030227 A1 | 1/2015 | Liang et al. |
| 2015/0146989 A1 | 5/2015 | Shiiyama et al. |
| 2016/0182805 A1 | 6/2016 | Emmett et al. |
| 2019/0034734 A1 | 1/2019 | Yen et al. |
| 2019/0130583 A1 | 5/2019 | Chen et al. |
| 2019/0347485 A1 | 11/2019 | Yang et al. |
| 2020/0219202 A1 | 7/2020 | Macciola et al. |
| 2020/0380643 A1 | 12/2020 | Ma et al. |
| 2020/0394452 A1 | 12/2020 | Ma et al. |
| 2020/0394453 A1 | 12/2020 | Ma et al. |
| 2020/0394763 A1 | 12/2020 | Ma et al. |
| 2021/0027431 A1 | 1/2021 | Ma et al. |
| 2021/0383150 A1 | 12/2021 | Thrasher et al. |
| 2021/0383163 A1 | 12/2021 | Ma et al. |

OTHER PUBLICATIONS

Phillips, P. "Support vector machines applied to face recognition." Advances in Neural Information Processing Systems 11 (1998): 803-809. (Year: 1998).*

(56) References Cited

OTHER PUBLICATIONS

Kung, Sun Yuan, Man-Wai Mak, Shang-Hung Lin, M. W. Mak, and S. Lin. Biometric authentication: a machine learning approach. New York: Prentice Hall Professional Technical Reference, 2005. (Year: 2005).*
Zhao, Wenyi, Rama Chellappa, P. Jonathon Phillips, and Azriel Rosenfeld. "Face recognition: A literature survey." ACM computing surveys (CSUR) 35, No. 4 (2003): 399-458. (Year: 2003).*
Turk, Matthew A., and Alex P. Pentland. "Face recognition using eigenfaces." In Proceedings. 1991 IEEE computer society conference on computer vision and pattern recognition, pp. 586-587. IEEE Computer Society, 1991. (Year: 1991).*
Joachims, Thorsten. "Transductive inference for text classification using support vector machines." In Icml, vol. 99, pp. 200-209. 1999. (Year: 1999).*
Macciola et al., U.S. Appl. No. 16/824,518, filed Mar. 19, 2020.
Notice of Allowance from U.S. Appl. No. 15/339,789, dated Apr. 7, 2020.
Notice of Allowance from U.S. Appl. No. 15/394,726, dated Apr. 16, 2020.
Notice of Allowance from U.S. Appl. No. 15/672,200, dated Apr. 17, 2020.
Non-Final Office Action from U.S. Appl. No. 16/194,201, dated Feb. 3, 2020.
Pinto et al., "Why is real-World Visual Object Recognition Hard?" PLoS Computational Biology, Jan. 2008, vol. 4, No. 1, pp. 0151-0156.
Lowe, D., "Object Recognition from Local Scale-Invariant Features," Proceedings of the International Conference on Computer Vision, Sep. 1999, pp. 1-8.
Non-Final Office Action from U.S. Appl. No. 16/151,090, dated Feb. 12, 2020.
Lee et al., "Extraction and Integration of Window in a 3D Building Model from Ground View images," IEEE Computer Society Conference on Computer Vision and Pattern Recognition, 2004, 8 pages.
Non-Final Office Action from U.S. Appl. No. 15/672,200, dated Feb. 21, 2020.
Final Office Action from U.S. Appl. No. 16/267,205, dated Feb. 24, 2020.
Examination Report from European Application No. 14861942.2, dated Oct. 1, 2019.
Notice of Allowance from U.S. Appl. No. 16/052,495, dated Mar. 18, 2020.
Examiner's Answer to Appeal Brief from U.S. Appl. No. 15/396,306, dated May 15, 2020.
Notice of Allowance from U.S. Appl. No. 16/194,201, dated May 19, 2020.
Notice of Allowance from U.S. Appl. No. 16/206,926, dated May 21, 2020.
Notice of Allowance from U.S. Appl. No. 16/151,090, dated Jun. 4, 2020.
Notice of Allowance from U.S. Appl. No. 16/267,205, dated Jun. 19, 2020.
Corrected Notice of Allowance from U.S. Appl. No. 16/151,090, dated Jul. 22, 2020.
Ma et al., U.S. Appl. No. 16/997,800, filed Aug. 19, 2020.
Non-Final Office Action from U.S. Appl. No. 16/206,912, dated Aug. 18, 2020.
Examination Report from European Application No. 14861942.2, dated Jun. 3, 2020.
Non-Final Office Action from U.S. Appl. No. 16/824,518, dated Sep. 3, 2020.
Corrected Notice of Allowance from U.S. Appl. No. 16/151,090, dated Aug. 28, 2020.
Corrected Notice of Allowance from U.S. Appl. No. 16/194,201, dated Aug. 28, 2020.
Ma et al., U.S. Appl. No. 17/005,147, filed Aug. 27, 2020.
Ma et al., U.S. Appl. No. 17/005,171, filed Aug. 27, 2020.
Notice of Allowance from U.S. Appl. No. 16/206,926, dated Sep. 8, 2020.
Ma et al., U.S. Appl. No. 17/006,636, filed Aug. 28, 2020.
Ma et al., U.S. Appl. No. 17/006,650, filed Aug. 28, 2020.
Notice of Allowance from U.S. Appl. No. 16/267,205, dated Oct. 15, 2020.
Non-Final Office Action from U.S. Appl. No. 16/569,247, dated Oct. 29, 2020.
Notice of Allowance from U.S. Appl. No. 16/824,518, dated Jun. 1, 2021.
Supplemental Notice of Allowance from U.S. Appl. No. 16/206,912, dated May 28, 2021.
Supplemental Notice of Allowance from U.S. Appl. No. 16/267,205, dated Jun. 9, 2021.
Thrasher et al., U.S. Appl. No. 17/348,584, filed Jun. 15, 2021.
Ma et al., U.S. Appl. No. 17/348,617, filed Jun. 15, 2021.
Examination Report from European Application No. 20194730.6, dated Dec. 11, 2020.
Final Office Action from U.S. Appl. No. 16/824,518, dated Feb. 23, 2021.
Notice of Allowance from U.S. Appl. No. 16/267,205, dated Mar. 12, 2021.
Notice of Allowance from U.S. Appl. No. 16/206,912, dated Mar. 8, 2021.
Supplemental Notice of Allowance from U.S. Appl. No. 16/206,912, dated Mar. 17, 2021.
Non-Final Office Action from U.S. Appl. No. 16/569,247, dated May 12, 2021.
Notice of Allowance from U.S. Appl. No. 16/206,912, dated Nov. 16, 2020.
Supplemental Notice of Allowance from U.S. Appl. No. 16/824,518, dated Jul. 15, 2021.
Phillips, P., "Support Vector Machines Applied to Face Recognition," Advances in Neural Information Processing Systems, 1998, pp. 803-809, retrieved from https://papers.nips.cc/paper/1998/file/a2cc63e065705fe938a4dda490092966f-Paper.pdf.
Turk et al., "Face Recognition Using Eigenfaces," IEEE Computer Society Conference on Computer Vision and Pattern Recognition, 1991, pp. 586-591.
Notice of Allowance from U.S. Appl. No. 16/569,247, dated Aug. 31, 2021.
Patent Board Decision on Appeal from U.S. Appl. No. 15/396,306, dated Oct. 29, 2021.
Non-Final Office Action from U.S. Appl. No. 16/997,800, filed Nov. 9, 2021.
Kim et al., "Document Capturing Method with a Camera using Robust Feature Points Detection," International Conference on Digital Image Computing: Techniques and Applications, IEEE, 2011, pp. 678-682.
Bulatov et al., "Smart IDReader: Document Recognition in Video Stream," 14th IAPR International Conference on Document Analysis and Recognition, 2017, pp. 39-44.
Liang et al., "Camera-based analysis of text and documents: a survey," Digital Object Identifier, International Journal an Document Analysis and Recognition, 2005, pp. 84-104.
Notice of Allowance from U.S. Appl. No. 16/569,247, dated Dec. 10, 2021.

* cited by examiner

SYSTEMS AND METHODS FOR IDENTIFICATION DOCUMENT PROCESSING AND BUSINESS WORKFLOW INTEGRATION

PRIORITY CLAIM

This application is a continuation of U.S. application Ser. No. 15/051,587, filed Feb. 23, 2016, which is a continuation of U.S. application Ser. No. 14/220,016, filed Mar. 19, 2014, which is a continuation-in-part of U.S. application. Ser. No. 13/740,123, filed Jan. 11, 2013, which claims the benefit of U.S. Provisional Application No. 61/586,062, filed Jan. 12, 2012, and U.S. Provisional Application No. 61/720,958, filed Oct. 31, 2012, each of which are herein incorporated by reference.

RELATED APPLICATIONS

This application is related to U.S. Pat. No. 8,526,739 U.S. patent application Ser. No. 13/802,226, filed Mar. 13, 2013 and from U.S. Provisional Patent Application No. 61/780,747, filed Mar. 13, 2013, each of which are herein incorporated by reference.

FIELD OF INVENTION

The present invention relates to image capture and image processing, and more particularly to capturing and processing digital images of identity documents (IDs) in connection with performing part or all of a business workflow using a mobile device.

BACKGROUND

Digital images having depicted therein a document such as a letter, a check, a bill, an invoice, etc. have conventionally been captured and processed using a scanner or multi-function peripheral coupled to a computer workstation such as a laptop or desktop computer. Methods and systems capable of performing such capture and processing are well known in the art and well adapted to the tasks for which they are employed.

However, in an era where day-to-day activities, computing, and business are increasingly performed using mobile devices, it would be greatly beneficial to provide analogous document capture and processing systems and methods for deployment and use on mobile platforms, such as smart phones, digital cameras, tablet computers, etc.

A major challenge in transitioning conventional document capture and processing techniques is the limited processing power and image resolution achievable using hardware currently available in mobile devices. These limitations present a significant challenge because it is impossible or impractical to process images captured at resolutions typically much lower than achievable by a conventional scanner. As a result, conventional scanner-based processing algorithms typically perform poorly on digital images captured using a mobile device.

In addition, the limited processing and memory available on mobile devices makes conventional image processing algorithms employed for scanners prohibitively expensive in terms of computational cost. Attempting to process a conventional scanner-based image processing algorithm takes far too much time to be a practical application on modern mobile platforms.

A still further challenge is presented by the nature of mobile capture components (e.g. cameras on mobile phones, tablets, etc.). Where conventional scanners are capable of faithfully representing the physical document in a digital image, critically maintaining aspect ratio, dimensions, and shape of the physical document in the digital image, mobile capture components are frequently incapable of producing such results.

Specifically, images of documents captured by a camera present a new line of processing issues not encountered when dealing with images captured by a scanner. This is in part due to the inherent differences in the way the document image is acquired, as well as the way the devices are constructed. The way that some scanners work is to use a transport mechanism that creates a relative movement between paper and a linear array of sensors. These sensors create pixel values of the document as it moves by, and the sequence of these captured pixel values forms an image. Accordingly, there is generally a horizontal or vertical consistency up to the noise in the sensor itself, and it is the same sensor that provides all the pixels in the line.

In contrast, cameras have many more sensors in a non-linear array, e.g., typically arranged in a rectangle. Thus, all of these individual sensors are independent, and render image data that is not typically of horizontal or vertical consistency. In addition, cameras introduce a projective effect that is a function of the angle at which the picture is taken. For example, with a linear array like in a scanner, even if the transport of the paper is not perfectly orthogonal to the alignment of sensors and some skew is introduced, there is no projective effect like in a camera. Additionally, with camera capture, nonlinear distortions may be introduced because of the camera optics.

Other major challenges unique to capturing image and/or video data utilizing a camera or array of cameras may include variable illumination conditions, for instance non-uniform lighting conditions that may generate shadows on objects depicted in images, presence of specular lights which may generate glare, etc. as would be understood by skilled artisans upon reading these disclosures.

In addition, utilizing cameras to capture image and/or video data introduces challenges with respect to distinguishing an object of interest from relatively complex backgrounds as compared to the typical background for a flat-bed scanner (which exhibits characteristics that are well-known and relatively immutable, for instance a single background texture and color for the scanner background). As a result, clustered background makes page segmentation difficult and challenging as compared to scenarios typically encountered using scanner-generated image data.

In view of the challenges presented above, it would be beneficial to provide an image capture and processing algorithm and applications thereof that compensate for and/or correct problems associated with image capture and processing using a mobile device, while maintaining a low computational cost via efficient processing methods.

Moreover, mobile devices are emerging as a major interface for engaging a wide variety of interactive processes relying on data often depicted on financial documents. A primary advantage of the mobile interface is that the documents that can be conveniently and securely imaged utilizing a mobile device. For example, the banking industry has recently witnessed a mobile revolution, with much attention gathering around new services and functionalities enabled by mobile technology, such as mobile check deposit and mobile bill payment. These applications leverage the persistent connectivity of mobile devices to provide customers and service providers unprecedented accessibility and quality of service, consequently improving resolution and accuracy of financial transaction record management, and improving security of financial transactions due to known security advantages of mobile devices.

To date, these applications have been limited in scope to simple transactions leveraging conventions and standards unique to very narrow aspects of the financial services industry. Most notably, the financial industry has been able to leverage conventions such as the universal formatting of account and routing numbers, the near-universal presence of magnetic ink character recognition (MICR) on documents utilized in financial transactions, such as checks, remittance slips, etc.

As described in U.S. Pat. Nos. 7,778,457; 7,787,695; 7,949,167; 7,953,268; 7,978,900; 8,000,514; 8,326,015; 8,379,914; 8,577,118; and/or U.S. Pat. No. 8,582,862 to Nepomniachtchi, et al., the conventional mobile financial services involves mobile image processing and mobile check deposit approaches that rely heavily on MICR characters. The MICR characters are used to conduct the image processing operations that are necessary to ensure adequate image quality for subsequent financial processing, such as ensuring the image is the proper size and/or orientation. The MICR characters are also used to conduct the financial processing aspects, such as routing payments/deposits to the account corresponding to the number depicted on the imaged check or remittance slip.

Reliance on such conventional standards and industry-specific practices allows high-fidelity and high-performance in the very limited scope to which those standards and practices apply, but unfortunately limit the applicability of the underlying technology to only those narrow fields. It would be of great advantage to remove the reliance on such standard information and enable broader application of mobile technology to modern image capture, processing, and business workflow integration. For example, while identity documents universally depict identifying information that is useful in a wide variety of applications, including but certainly not limited to financial transactions, it is relatively uncommon for various types of ID to conform to a universal standard for presenting this information (e.g. presenting the information in a manner analogous to the MICR characters of a check). Indeed, even the same type of ID, such as a driver's license, may depict different information, or depict similar information in a very different format, manner, and/or layout depending on the authority that issued the ID. Consider, for example, the disparity between driver licenses issued by various states, or between employee IDs according to employer, school IDs according to district, military IDs according to branch, insurance cards according to provider, etc.

Accordingly, it would be of great benefit to provide systems, techniques, and computer program products capable of leveraging mobile technology to utilize identity information depicted on IDs and integrate the imaging, capture, and processing of IDs with business workflows.

The presently described systems and techniques accordingly provide uniquely advantageous features with application beyond the narrow scope of financial transactions. The inventive concepts disclosed below also remove the limitations associated with relying on universal standards such as MICR characters that are inapplicable to IDs.

SUMMARY OF THE INVENTION

In one embodiment, a method includes: receiving or capturing an image comprising an identity document (ID) using a mobile device; classifying the ID; analyzing the ID based at least in part on the ID classification; determining at least some identifying information from the ID; at least one of building an ID profile and updating the ID profile, based at least in part on the analysis; providing at least one of the ID and the ID classification to a loan application workflow; and driving at least a portion of the workflow based at least in part on the ID and the ID classification.

In another embodiment, receiving or capturing an image comprising an identity document (ID) using a mobile device; classifying the ID; analyzing the ID based at least in part on the ID classification; determining at least some identifying information from the ID; at least one of building an ID profile and updating the ID profile, based at least in part on the analysis; providing at least one of the ID and the ID classification to a new financial account workflow; and driving at least a portion of the workflow based at least in part on the ID and the ID classification.

In yet another embodiment, a computer program product includes a computer readable storage medium. The computer readable storage medium has computer readable program code stored therein, and the computer readable program code includes instructions configured to cause a processor to: receive or capturing an image comprising an identity document (ID) using a mobile device; classify the ID; analyze the ID based at least in part on the ID classification; determine at least some identifying information from the ID; at least one of building an ID profile and updating the ID profile, based at least in part on the analysis; provide at least one of the ID and the ID classification to a new financial account workflow; and drive at least a portion of the workflow based at least in part on the ID and the ID classification.

Other aspects and features of the presently disclosed inventive concepts will become apparent from the following detailed descriptions, which should be understood to be illustrative in nature and not limiting on the instant disclosure.

DETAILED DESCRIPTION

Figure 1:
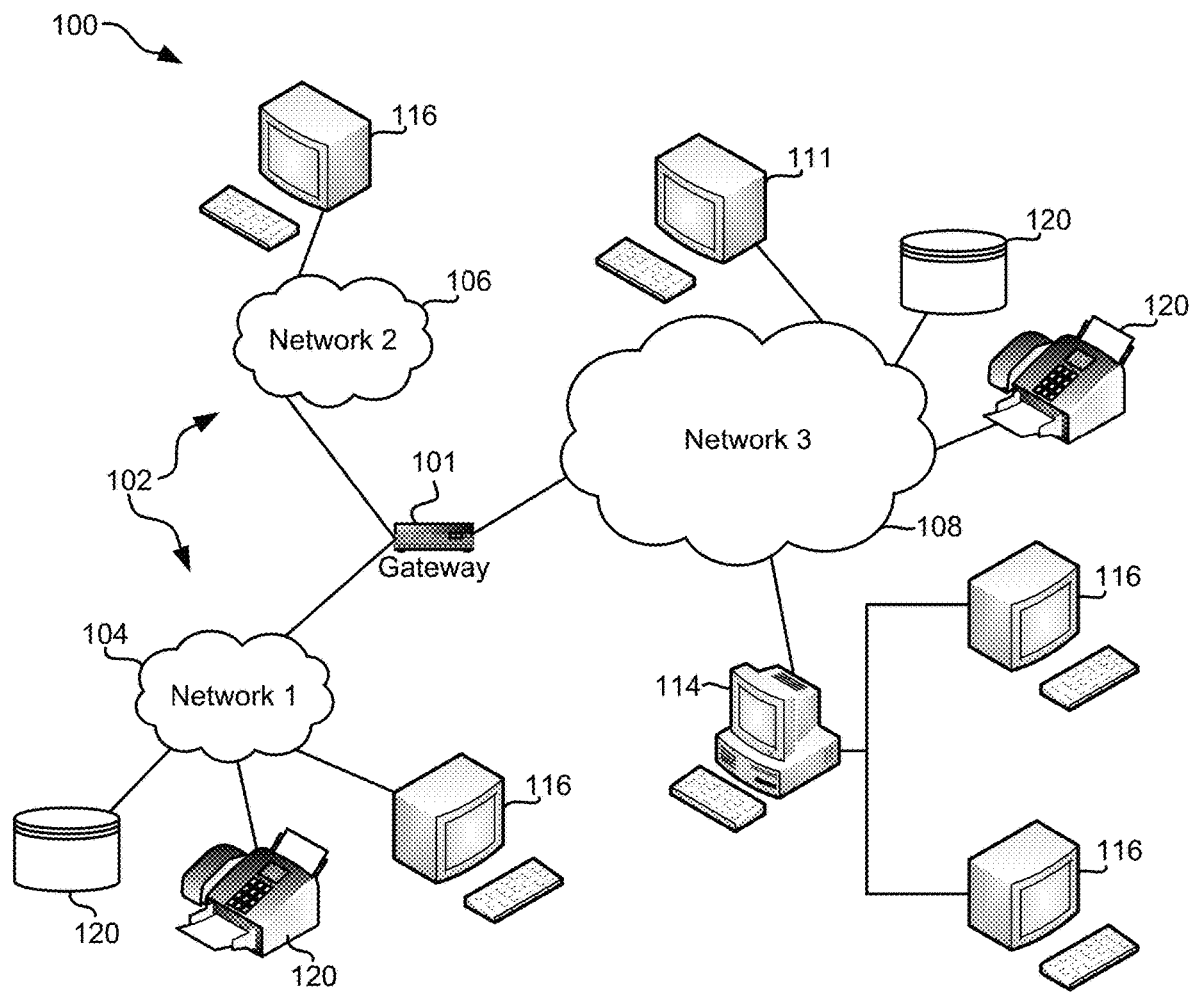
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

General Workflow Concepts

The present descriptions set forth novel and useful techniques and technologies configured to leverage the emerging advances in mobile, image and video capture, image and video analysis, and location-based services and technologies. These disclosures present exemplary and novel implementations from the perspective of users of mobile devices conducting various business processes. The business processes are wholly or partially embodied as workflows, executable and/or capable of being interfaced with via a mobile device. The workflows also uniquely leverage image and video capture/processing and location-based aspects of mobile technology to enhance the user experience with respect to generating, managing, and performing the workflow(s).

A user experience for mobile smart application development includes workflows, as well as any constituent operations forming the workflows (e.g. activities and rules), and associated systems, tools, or techniques relating to creation, performance, and/or management of the workflows. Preferably, the user experience, workflows (e.g. activities and/or rules), etc. are embodied as a mobile application, and may be based in whole or in part on techniques, technology, and/or concepts disclosed in related Provisional U.S. Application No. 61/815,210, filed May 30, 2013.

For example, in one embodiment mobile applications configured to initiate, facilitate, or conduct portions of and/or complete workflows in the context of the present application may be considered to encompass the following general scenario.

A user defines a workflow as a set of activities and rules. The workflow executes by moving from one activity to another in a fixed order or a by a dynamic order as determined by stimuli. Rules are applied at fixed points within the sequence or in response to stimuli. The user also designs UIs independently, with assistance from the development platform, or UIs are rendered automatically by development platform tools to associate with activities that require human interaction.

The workflow, via activities, rules and UI definitions, defines a mobile user experience which provides both the mobile UI and also the application behavior. The process definition can describe the application behavior because the mobile development platform exposes a federated view of native mobile services and server services. The process executes and transparently orchestrates the execution of native code directly on the device and remote code that resides on a server.

In one embodiment, a user launches a mobile application. The application initiates the process, takes the first activity and renders the defined UI. The user interacts with the UI and completes the activity or provides stimuli, such as "clicking" a UI button. At this point a rule may be executed or the next activity may be taken/performed. In either case local native services may be accessed, such as the device location being retrieved from the OS or a server service, such as a database lookup, may be used. This provision of native and/or remote services is transparent to the user.

The mobile application may be downloaded in whole or in part and/or run in real-time on the mobile device. For example, the application may be maintained in an online repository. An instance of the mobile application may be transferred to the mobile device automatically, in response to a user request, in response to a new release of the mobile application becoming available in the online repository, etc. In a preferred embodiment, transferring new instances of the mobile application to mobile devices and instantiating those new instances is a process that occurs transparently to the user and without requiring any interaction or instruction from end-users operating the mobile application on mobile devices.

Of course, other equivalent forms of the presently described workflows and implementations thereof on mobile devices are also to be understood as falling generally within the scope of the present descriptions according to the understanding that would be achieved by one having ordinary skill in the art based on reviewing the instant application.

Mobile Image Capture and Processing

As discussed herein, "image processing" (and particularly image processing using a mobile device) should be understood to optionally include any of the techniques and/or technology disclosed in related U.S. patent application Ser. No. 13/740,123 filed Jan. 11, 2013.

These techniques include but are not limited to capturing image data using a mobile device, image processing algorithms configured to improve image quality, and particular with respect to images of documents. For example, "image processing" in various embodiments may include one or more of page detection, rectangularization, skew correction, color conversion (e.g. from 24-bit RGB color to 8-bit grayscale, 1-bit bitonal, or other color depth representation as understood by those having ordinary skill in the art), resolution estimation, illumination correction, blur detection, etc. as disclosed in related U.S. patent application Ser. No. 13/740,123, and/or as would be understood by one having ordinary skill in the art upon reading the present descriptions.

While the present descriptions are offered primarily with reference to exemplary embodiments utilizing image data captured and/or in the form of still images, e.g. digital photographs, the skilled artisan reading the present descriptions will also understand that these principles apply equally to the use of digital video data. Of particular interest are techniques and/or technologies configured to capture and/or process video data using a mobile device. Further information describing the capture and processing of video data as a source of information may be reviewed in the disclosures presented in related Provisional U.S. Patent Application No. 61/819,463, filed May 3, 2013, which is herein incorporated by reference.

In addition, and according to various embodiments, the presently disclosed methods, systems and/or computer program products may utilize and/or include any of the classification and/or data extraction functionalities disclosed in related U.S. patent application Ser. No. 13/802,226, filed Mar. 13, 2013 and Provisional U.S. Patent Application No. 61/780,747, filed Mar. 13, 2013.

With the foregoing relation to associated inventive concepts in the field of mobile technology, mobile image processing, and workflow management, exemplary inventive principles of the presently disclosed workflows utilizing location-based services, location information, etc. may be understood to include the following general embodiments.

General Embodiments

In one general embodiment, a method includes: initiating a workflow; receiving an image comprising an identity document (ID); processing the image to generate data comprising one or more of: identifying information from the ID; and a portion of the image depicting the ID; and submitting data to the workflow; and driving at least a portion of the workflow using some or all of the data.

In another general embodiment, a method involves: capturing or receiving at least one image of one or more identity documents (IDs) using a mobile device; determining identifying information from one or more of the IDs; building an ID profile based on the identifying information; storing the ID profile to a memory of the mobile device; invoking a workflow configured to facilitate a business transaction; detecting a predetermined stimulus in the workflow, the stimulus relating to the business transaction; providing at least a portion of the ID profile to the workflow in response to detecting the predetermined stimulus; and driving at least a portion of the workflow using the provided portion of the ID profile.

In yet another general embodiment, a computer program product, comprises a computer readable storage medium. The computer readable storage medium has computer readable program code stored therein, and the computer readable program code includes instructions configured to cause a processor to: capture or receive at least one image of one or more identity documents (IDs) using a mobile device; determine identifying information from the one or more IDs; build an ID profile based on the identifying information; store the ID profile to a memory of the mobile device; invoke a workflow configured to facilitate a business transaction; detect a predetermined stimulus relating to the business transaction; provide at least a portion of the ID profile to the workflow in response to detecting the predetermined stimulus; and facilitate the business transaction using the provided portion of the ID profile.

General Computing and Networking Concepts

Turning now to the figures, FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, mobile device, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
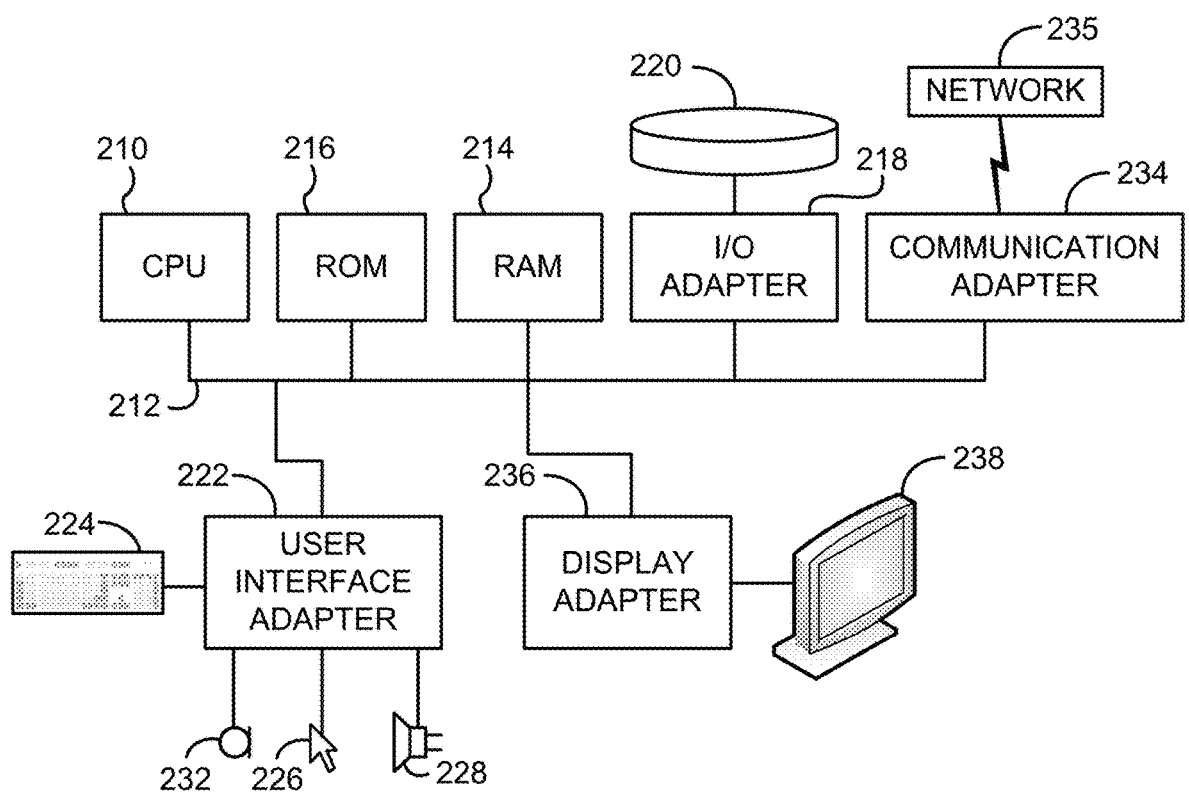
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of brevity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

Identity Documents (IDs)

The present descriptions relate to, and are in the field of mobile device-mediated image capture and processing of identity documents for integration with business workflows. As understood herein, the term "identity document" or "ID" should be understood to include any type of document that may be presented for purposes of proving, authenticating, or verifying all or part of an entity's identity. The ID includes one or more types of identifying information, which generally vary according to the type of ID and the type of entity to which the ID corresponds, but various types of IDs may depict one or more common types of identifying information.

Exemplary forms of ID as contemplated herein should be understood to include, but not be limited to, government-issued IDs such as passports, military IDs, tax IDs, Social Security cards, birth certificates (where issued by government agency), licenses or permits such as a hunting license, professional license, driver's license, etc. in one embodiment.

IDs may also include employer-issued IDs such as employee IDs, security documents or badges, payroll documents, benefits documents, certifications, etc., in more embodiments.

IDs may still further include financial documents such as insurance policies, cards, and other associated insurance documents, documents depicting financial account information, such as account statements, tender documents associated with financial accounts such as checks, credit cards, debit cards, etc.

In another embodiment, IDs may additionally and/or alternatively include medical documents, such as a physician's chart, a prescription, a medical profile or evaluation, a genetic sequence or profile or other document containing genetic information, etc. as would be understood by one having ordinary skill in the art upon reading the present descriptions.

In at least some approaches, an ID may identify multiple entities, human and/or non-human. For example, in the case of a medical document, a prescription may be considered to identify at least two human entities (the patient, the prescribing physician, and/or dispensing pharmacist) and at least two non-human entities (the drug, and the pharmacy dispensing the drug). In various embodiments, the ID may therefore be considered to correspond to any number of these entities, usually for different purposes relating to the entity or entities the ID is considered to correspond to in the particular context at hand. In another example, an insurance document may be considered to correspond to at least one human entity (the policyholder, insured driver (e.g. if not the primary or named policyholder)) and at least one nonhuman entity (the vehicle, e.g. via a VIN, license plate number, make/model/year, etc.).

In still more embodiments, IDs may additionally and/or alternatively comprise a photograph, e.g. a photograph of an individual or an individual's face, which may be utilized singly or in unison with other identifying information and/or IDs. Preferably, the photograph and the other ID(s) depict a same or similar photographic image of the individual to which the IDs correspond, such as a driver's license and a facial photograph captured using a mobile device.

In various approaches, IDs may include any other type of document depicting identifying information such as defined below, as would be understood by one having ordinary skill in the art upon reading the present descriptions.

Moreover, IDs need not necessarily be embodied as physical documents, although physically embodied IDs are preferred. In some approaches IDs may exist in the form of electronic records depicting the identifying information, or image data depicting the ID or identifying information.

In several approaches, IDs may include a single document or a plurality of documents. Each ID may also include a plurality of pages per document, e.g. a "front" and "back" side of an ID such as a driver's license, credit card, etc.; multiple pages of a passport, medical record, credit report, etc. as would be understood by one having ordinary skill in the art upon reading the present descriptions. In embodiments where multiple-paged documents depict similar or redundant information, the information identified from each page of the document may be utilized as a validation tool to determine accuracy of data extracted from each respective page, as would be understood by one having ordinary skill in the art upon reading the present descriptions.

Identifying Information

Generally speaking, identifying information includes any type of information depicted on an ID and which may be utilized singly or in combination to determine, authenticate, or verify an entity to which the ID corresponds.

Where the entity to which the ID corresponds is a human, and particularly where the ID comprises image data depicting the human, exemplary identifying information may include biometric data. As understood herein, "biometric data" may include any type of characteristic, and preferably a physical measure, utilized singly or in combination to uniquely identify a biological entity. Exemplary biometric data may include characteristics used to identify human individuals, such as fingerprint characteristics (e.g. number and pattern of ridges, inter-ridge spacing, etc.), ocular characteristics (such as retinal vein pattern, iris striations, etc.), facial structure (such as distance measured between various features on the individual's face, including interpupillary distance, etc.), or any other characteristics such as would be understood by one having ordinary skill in the art of biometric identification upon reading the present descriptions.

In some approaches, the "individual" to which the ID corresponds may not necessarily include a human individual, but may correspond instead to non-human entity such as a legal entity (e.g. the "state," an unspecified guardian, conservator, executor, fiduciary, creditor, debtor, etc.), a corporate entity (e.g. a corporation, an agent of the corporation, etc.), a financial entity (e.g. an account, a trust, etc.) and/or other similar non-human entities such as would be understood by one having ordinary skill in the art upon reading the present descriptions.

In even more preferred embodiments, IDs corresponding to a non-human entity may further correspond to a predetermined function, role or purpose falling generally within the purview and control of the non-human entity. For example, in one scenario involving an ID such as a credit card, the ID may correspond to a predetermined function or role such as an "authorized purchaser," "authorized payer," etc.

In other scenarios, the ID may correspond to a department of the non-human entity, such as an "accounts payable" department, a "billing" department, a "financing" department, etc. as would be understood by one having ordinary skill in the art upon reading the present descriptions.

In still other approaches, IDs corresponding to a non-human entity may further correspond to a predetermined business project, endeavor, investment, etc. IDs corresponding to exemplary non-human entities of this type may involve scenarios where an entity manages one or more matters for a client, e.g. in a fiduciary capacity. The entity may maintain an account on behalf of the client, and make expenditures, deposits, etc. using the account to conduct business on behalf of the client. For example, one common application of IDs corresponding to non-human entities in this project-oriented capacity may include an attorney managing an account on behalf of a client and conducting legal business/providing legal services utilizing the client account. The attorney may utilize an ID comprising a credit card, account statement, check, etc. identifying necessary account information to conduct the corresponding business and/or provide the desired services.

Similar examples may include an insurer managing an account corresponding to a policyholder and making distributions from the account corresponding to the policyholder, an executor/executrix managing an estate, a trustee managing a trust account, an investment firm managing an investment account, etc. as would be understood by one having ordinary skill in the art upon reading the present descriptions.

Accordingly, the present disclosures encompass business workflows and associated scenarios where an individual conducting a workflow may utilize plural IDs in the course of the workflow. Of course, it should be understood from these descriptions that an individual conducting a workflow may utilize one or more IDs that correspond to various entities, depending on the context of the workflow. In some approaches, IDs utilized in a workflow may correspond to an individual entity conducting the workflow, to an entity or entities relating to the workflow, to one or more objects or entities relating to the workflow, etc. as would be understood by one having ordinary skill in the art Preferably, where multiple IDs are utilized, at least one ID corresponds to a specific human entity, and at least one other ID corresponds to one of the aforementioned non-human entities. For example, in one approach a workflow relating to provision of medical services and/or payment therefor may utilize at least two IDs: a first ID corresponding to the patient (e.g. a driver's license, medical chart, electronic health record, etc.) and a second ID corresponding to the patient's insurance policy (e.g. an insurance card, policy statement, etc.). Of course, different combinations of IDs and scenarios involving more than two IDs, or plural IDs and one or more additional documents may also be employed without departing from the scope of the instant disclosures.

ID Identifiers

As referred to herein, "identifying information" includes information that can be used to identify the entity to which the ID corresponds, while ID identifying information, or "ID identifiers," include any information that identifies the identity document or characteristics of the identity document or record per se, rather than the entity to which the identity document corresponds. Identifying information, in various embodiments, may include textual information and/or image characteristics (i.e. data descriptive of part or all of the image of the ID, such image data descriptive of a photograph depicted on the ID).

For example, illustrative ID identifiers includes unique identifiers associated with IDs, such as a driver license number, Social Security number, ID number, etc., as well as dates associated with IDs, such as an issue date, an expiration date, etc., as well as any unique design or associated with an ID, such as a unique symbol, a pattern, a logo, emblem or seal, a hologram, and codes associated with IDs, such as a barcode or a security code like a credit card verification (CCV) number or personal identification number (PIN), etc. Of course, any other form of ID identifier that would be recognized by one having ordinary skill in the art upon reading the present descriptions is also included within the scope of these disclosures.

While an ID number may be considered to correspond to an individual, in at least some applications, for the purposes of this disclosure an ID number should be considered to correspond to the identity document and not exclusively to the individual. For example, in a numbering system with a fixed format (and therefore a finite number of possible combinations), ID numbers may be recycled or reused in connection with multiple individuals. Therefore, to the extent that a truly one-to-one relationship exists between the identity document and the corresponding individual, then the ID number may be considered to also correspond to the individual, but this should be understood as a special case encompassed within the broader scenario contemplated herein where an ID number corresponds to the document, and not necessarily the individual.

Biographical or Biological Information

IDs also depict identifying information understood herein generally as "biographical information" or "biological information," which includes any type of information that identifies or describes the entity to which the identity document corresponds, and which is generally an immutable or personal characteristic of who or what that entity is.

Exemplary biological information includes information such as a person's blood type, race, height, weight, hair color, eye color (natural), sex or gender.

Biographical information may also include social, cultural, or economic status information, such as marital status (single, married, divorced, etc.), social or economic class or caste, employment status (e.g. employed, unemployed, retired, etc.), political affiliation, religion or creed, etc.

Geographic Information

Identifying information should also be understood to include geographic information, which generally conveys information about one or more locations closely associated with the entity to which the ID corresponds. For example, geographic information may include one or more addresses, such as a residential address (e.g. for a driver's license, insurance card, tax form, or any number of different types of ID), employer address (e.g. for an employee ID, military ID, etc.), embassy or consulate address (e.g. for a passport), or any address of a similar location closely associated with the entity to which the ID corresponds.

Financial Information

In even more embodiments, identifying information may include financial information, such as a credit score, one or more account numbers, a financial servicing entity (e.g. servicing or processing entity such as a bank, VISA, AMERICAN EXPRESS, PayPal, etc.)

The ID may also depict financial information corresponding to one or more services offered in connection with the ID, particularly in the case of IDs such as insurance cards or various forms of medical identification. For example, financial information corresponding to services offered in connection with the ID may include a copay amount, a policy number, a policy expiration date, effective date, or duration, service provider (e.g. insurer), policyholder name, etc. as would be understood by one having ordinary skill in the art upon reading the present descriptions.

Legal Information

Exemplary identifying information should be understood to include legal information, such as an entity's legal name, maiden name, alias(es), titles, etc. Legal information may also include criminal history information, or outstanding criminal information (such as existence of outstanding warrants). Particularly in cases where the ID functions as a license for an entity to engage in a restricted activity, the ID may depict legal information including restrictions, for example indication of any required safety equipment such as corrective lenses for driving, limits for resource-oriented licenses such as a number or weight of game permitted under a particular hunting or importation license, etc. as would be understood by one having ordinary skill in the art upon reading the present descriptions.

Various forms of ID may also depict so-called "legal" information relating to security or access to various restricted locations, information, etc. For example, an employee ID may have depicted thereon a security clearance level, or integrated therewith a security device configured to communicate security clearance information, e.g. a RFID chip configured to communicate access codes corresponding to an employee's security clearance and accordingly grant access only to areas corresponding to the employee's security clearance level.

Medical Information

Identifying information, as understood herein, also includes medical information in at least some embodiments, such as medical insurance cards, driver's licenses, etc. For example, medical information may include any type of information such as may be useful to a provider of emergency medical services, such as an individual's blood type, a listing of any allergies or pharmacological sensitivities to which the individual is prone, sex/gender, race, name, end of life care wishes or directives (such as a do-not-resuscitate or "DNR" order), etc. as would be understood by one having ordinary skill in the art upon reading the present descriptions.

For purposes of disambiguation, while there may be some overlap between the conventional definitions of various types of identifying information set forth herein, the foregoing definitions should be understood as mutually exclusive in nature. For example, although under conventional definitions a medical insurance policy number may be considered both a type of "financial information" and "medical information," as defined herein the policy number is financial information.

It should further be understood that plural types of identifying information, although mutually exclusive to the types of information respectively encompassed thereby, are fully capable of being used together in various embodiments of the present disclosures. For example an ID utilized in the course of a business workflow may depict both medical information and financial information, and one or both types of identifying information may be used, singly or together in one or more portions of the workflow.

In related approaches, some embodiments may utilize plural IDs in the course of conducting a business workflow.

Figure 4:
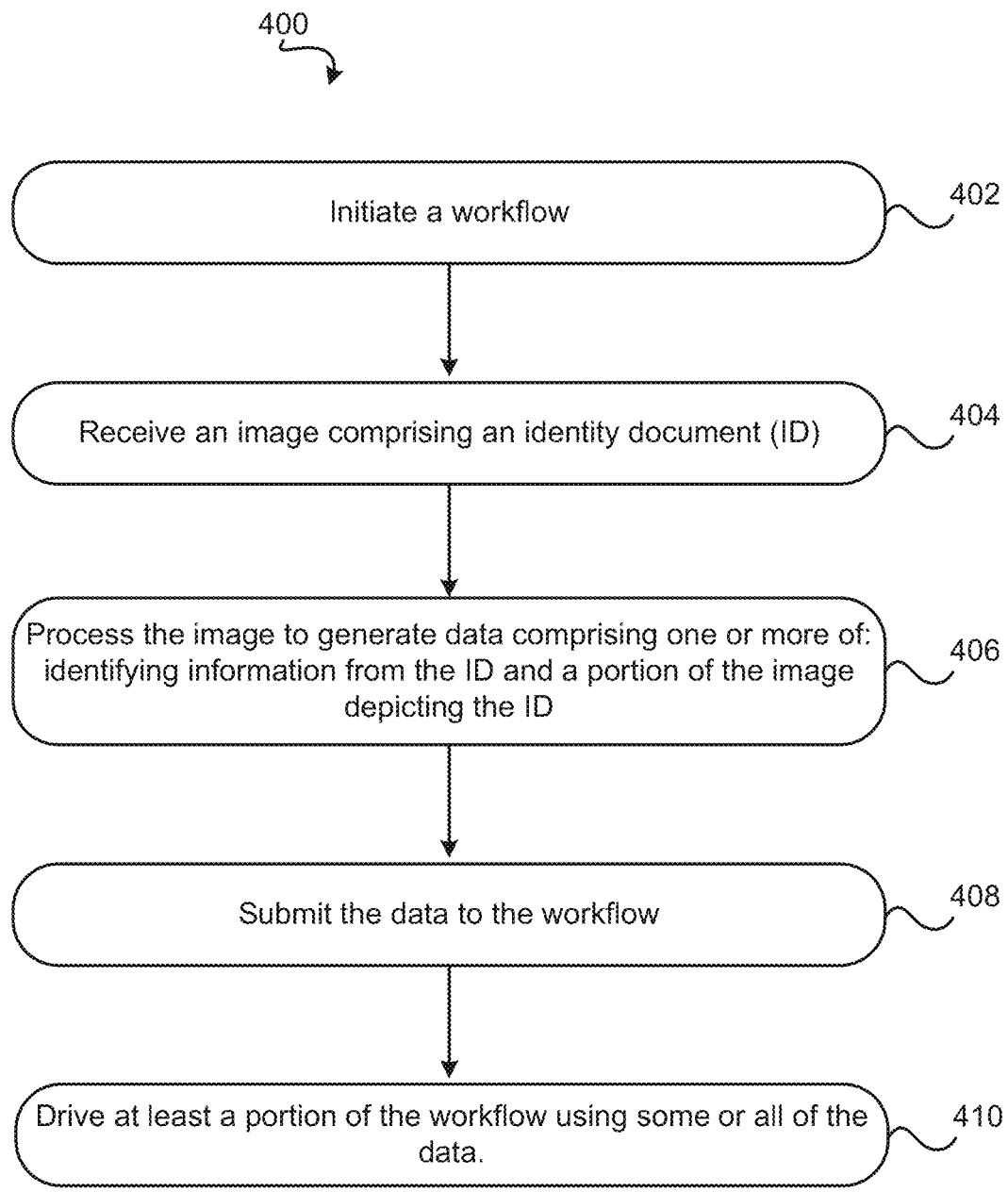
FIG. 4 is a flowchart of a method, according to one embodiment.

Referring again to the Figures, FIG. 4 depicts a method 400 generally illustrating the overall inventive process of integrating IDs and/or identifying information into business workflows, according to one embodiment. The method 400 may be practiced in any environment, using any number of suitable resources, such as depicted in FIGS. 1-2, among others.

The method 400 includes operation 402, where a workflow is initiated. The workflow is preferably initiated and run at least in part using a processor of a mobile device, but in various embodiments the workflow may utilize any number of suitable resources such as desktop workstations, mobile devices, servers, etc. Moreover, the workflow may be instantiated in any suitable manner, e.g. the workflow may be instantiated by a user, in response to detecting a predetermined stimulus in the course of performing an independent or related workflow, in response to detecting a trigger condition is satisfied, etc. as would be understood by one having ordinary skill in the art upon reading the present descriptions.

The method 400 also includes operation 404, in which an image comprising an ID is received. Again, the image is preferably received at a mobile device, or alternatively is captured using the mobile device, but the image may be received at any number of locations or resources involved in conducting the workflow. The ID may be of any type described herein, and preferably depicts identifying information pertinent to the workflow.

In operation 406, method 400 includes processing the received image. In the course of the processing operation, data are generated comprising identifying information from the ID, a portion of the ID image (e.g. a portion depicting only the ID but omitting background textures), or both, in various approaches. The data may be generated in any suitable format or manner, such as image data representing a photographic or pictorial portion of the ID, textual data representing identifying information depicted on the ID, etc.

Method 400 also includes operation 408, where the data are submitted to the workflow. The submitted data include some or all of the data generated in operation 406.

With continuing reference to FIG. 4, method 400 includes operation 410, where at least a portion of the workflow is driven using some or all of the submitted data.

In some approaches, method 400 may include additional and/or alternative operations. For example, in one embodiment method 400 optionally includes detecting a predetermined stimulus in the instantiated workflow, and in response to detecting the predetermined stimulus, either invoking a capture interface of the workflow or of the mobile device operating system, and capturing the image using the invoked capture interface. In this manner, the presently described workflows may be fully self-sufficient, including all the requisite capture and processing functionality to accomplish the underlying objective of the workflow.

Moreover still, in additional approaches the workflow comprises activities and rules. Preferably, the activities include one or more of a financial activity (such as a purchase of goods or services), an application activity (e.g. relating to a financial service such as a loan, a license such as a driver's license, a position such as an employment or political placement, an entitlement such as social security benefits, etc.), a reporting activity (such as reporting expenses associated with a business trip), a tracking activity (such as tracking delivery of a package or service), and/or other exemplary workflow activities such as would be understood by one having ordinary skill in the art upon reading these descriptions. Preferably, the activities of the workflow rely at least in part on data generated from the ID.

Figure 3:
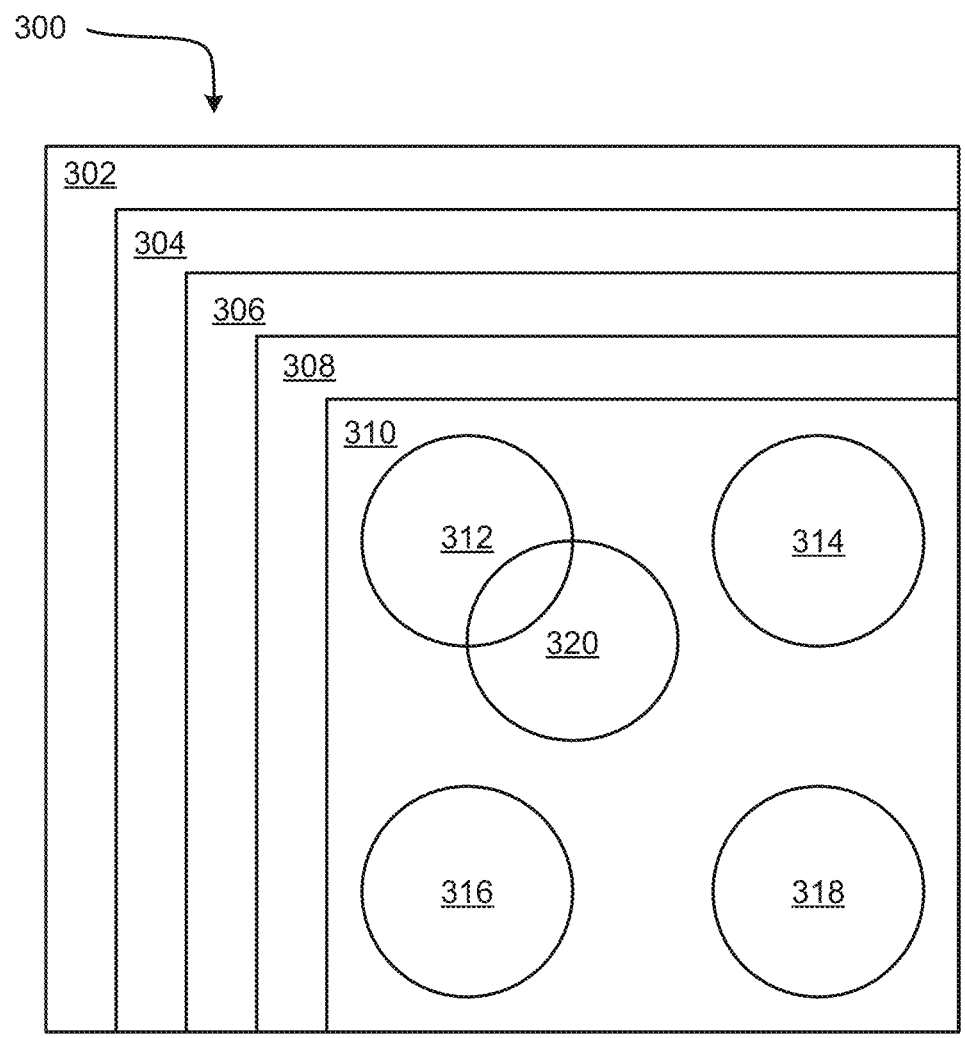
FIG. 3 is a schematic representation of concentric, parallel, and overlapping categories or classifications according to one embodiment of a hierarchical classification scheme and/or an iterative classification process.
Figure 5:
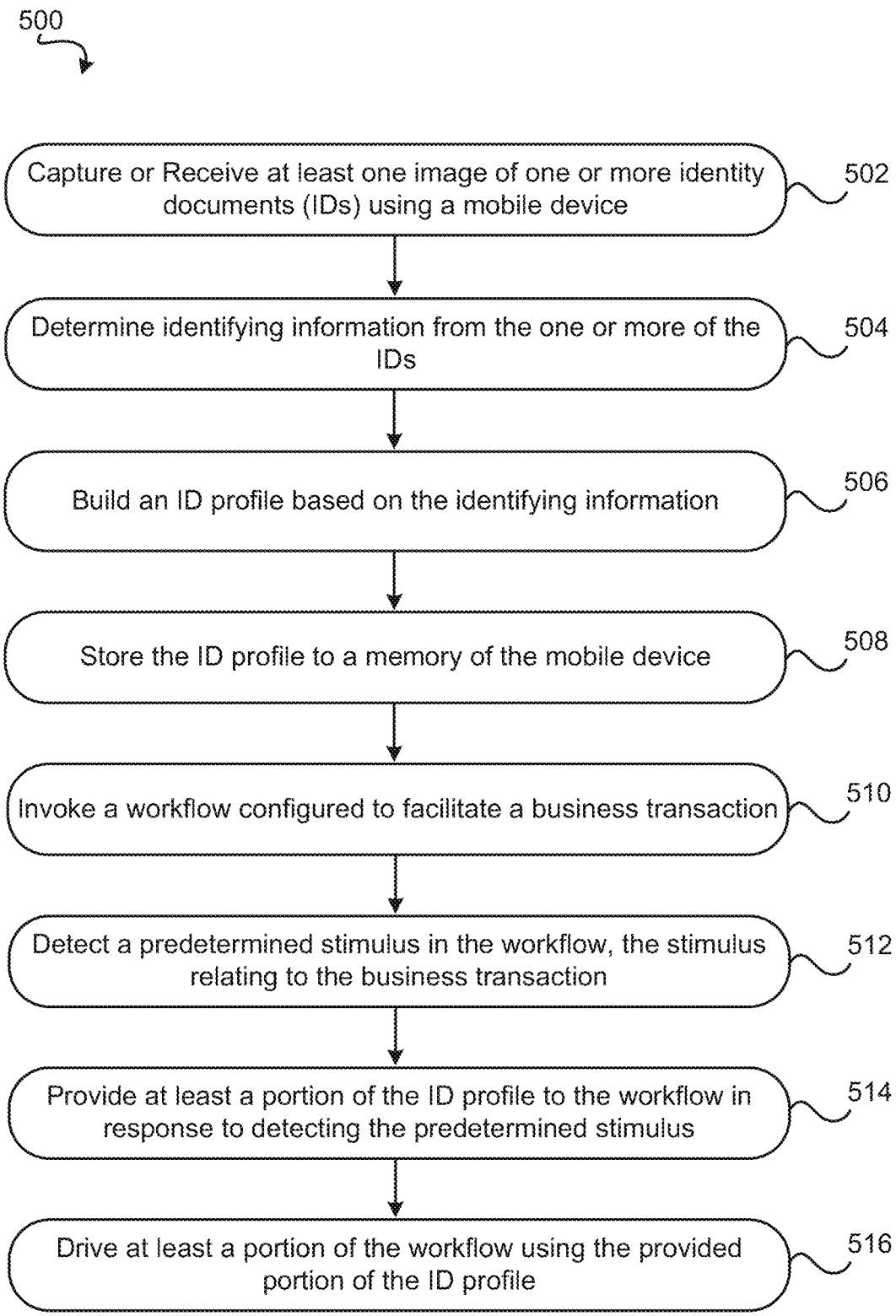
FIG. 5 is a flowchart of a method, according to one embodiment.

Referring again to the Figures, FIG. 5 depicts a method 500 generally illustrating the overall inventive process of integrating IDs and/or identifying information into business workflows, according to one embodiment. The method 500 may be practiced in any environment, using any number of suitable resources, such as depicted in FIGS. 1-3, among others.

The method 500 includes operation 502, where at least one image of one or more IDs are captured or received using a mobile device.

The method 500 also includes operation 504, in which identifying information is determined from one or more of the IDs. The identifying information may be determined using any suitable technique, such as utilizing optical character recognition to recognize textual characters on an ID, facial recognition to recognize a photograph of a human face or portrait, etc. as would be understood by those having ordinary skill in the art upon reading the present descriptions. In other embodiments, identifying information may be determined from an ID or IDs using a lookup operation, for example where a unique string suitable for use as an ID identifier (e.g. a driver's license number, social security number, tax ID number, etc.) is determined from the ID (e.g. using OCR, barcode scanning, etc.) and utilized to retrieve additional identifying information that may or may not be depicted on the ID itself. In one illustrative scenario, the lookup may utilize the unique ID identifier as a query to a database comprising identifying information values for which the unique string is a key. Of course, other data structures rather than a database may be employed without departing from the scope of the present descriptions.

In operation 506, method 500 includes building an ID profile based in whole or in part on the generated data. The ID profile, as described in further detail with respect to various exemplary embodiments throughout these descriptions, may be built in any suitable form or using any suitable technique, and includes preferably identifying information from one or more IDs, even more preferably at least two of a plurality of IDs from which the data were generated. Even more preferably, the built ID profile comprises identifying information and/or image data from the plural IDs.

With continuing reference to FIG. 5, method 500 includes operation 508, where the ID profile is stored to memory, preferably a memory of the mobile device.

In operation 510 a workflow configured to facilitate a business transaction is invoked. The workflow may be invoked in any suitable manner, and may be configured to facilitate a business transaction in any suitable technique such as described in further detail below with respect to several exemplary embodiments below concerning data extraction.

Moreover, method 500 includes operation 512 and detecting a predetermined stimulus in the workflow. The stimulus, further still, preferably relates to the business transaction. For example, in one approach the stimulus comprises the workflow presenting a user interface having one or more fields or utilizing one or more calculations relying on transactional data required for the particular business transaction (e.g. an account number where the business transaction comprises a financial transaction such as a sale, and as described in further detail below).

In response to detecting the predetermined stimulus in operation 512, the method 500 proceeds by providing at least a portion of the ID profile to the workflow, and subsequently driving some or all of the workflow using the provided portion(s) of the ID profile. Preferably, the provided portions comprise identifying information relating to the workflow and/or an underlying transaction.

Having now described the general inventive concepts disclosed herein with respect to ID business workflow integration, the following exemplary scenarios illustrate application of those general concepts to several practical scenarios.

As will become clear from the following exemplary embodiments, IDs may be used to great advantage when integrated with business workflows of various types and in various contexts. The exemplary scenarios are intended to be illustrative in nature and should not be considered limiting on the scope of the present disclosures. Rather, any equivalent application, permutation, variation, combination or synthesis of the presently disclosed concepts that would be recognized by one having ordinary skill in the art upon reading this disclosure is incorporated herein.

Business Workflow ID Integration

As described herein with reference to various exemplary scenarios, workflows may leverage an ID and/or identifying information depicted thereon to synthesize or build an identity profile for the particular workflow. The ID profile may be built specifically for a particular workflow, or may be a more general ID profile built in a manner such as to be compatible with a plurality of different workflow types. In preferred approaches, an ID profile may be built in the course of performing one or more workflows, and stored for future recall and/or use.

Moreover, stored ID profiles may be modified throughout the course of performing subsequent workflows. In one illustrative approach, an ID profile may be updated in order to update out-of-date identifying information such as pursuant to a change of address, closing or opening of an account, etc. as would be understood by one having ordinary skill in the art upon reading the present descriptions.

In some approaches, the ID profile may comprise the ID. For example, in one workflow an ID image is utilized for authentication purposes, as a "profile image" or "security image" such as would be understood by one having ordinary skill in the art upon reading the present descriptions. Other security measures may be employed to ensure that stored information from the ID, including the ID itself, is protected against unauthorized access, in various approaches. Any suitable security measures known in the art may be utilized, such as encryption, password authentication, biometric authentication, etc.

In other approaches, the ID profile may include any type of information useful to the workflow, and preferably includes identifying information depicted on the ID or on plural IDs. Even more preferably, the identifying information in the ID profile includes at least one ID identifier such as defined above.

Moreover, an entity may have associated therewith a plurality of ID profiles, and each profile may be specifically tailored for a predetermined workflow instance, a particular workflow type, a downstream application, etc. as would be understood by one having ordinary skill in the art upon reading the present descriptions. For instance, in one exemplary scenario an individual utilizes the presently disclosed concepts to conduct various business workflows, and maintains a plurality of ID profiles, each ID profile corresponding to a specific one of the various business workflows. An automotive ID profile may, for example, contain identifying information relating to the entity's driving record, driver's license, automobile insurance, etc. Similarly, a financial ID profile may include identifying information relating to an entity's financial status or activity, e.g. identifying information that may be obtained from a credit report, an account statement, tax filings, etc. A medical ID profile may include identifying information such as may be obtained from medical records, pharmaceutical records, medical insurance information, etc. as would be understood by one having ordinary skill in the art upon reading the present descriptions.

For example, an ID often depicts information having utility in relation to an activity of a workflow, such as a portrait, a name, a date of birth, an address, one or more unique identifiers, etc. Using this information, an identity profile may be built for a particular workflow based on information required to complete various activities in the workflow. In one approach, a workflow involving a financial transaction includes building an identity profile comprising a first name and last name based on an ID. The workflow may subsequently utilize the identity profile to automatically provide the first and last name in connection with any financial transaction attempted in connection therewith.

In even more approaches, an ID profile may be built in connection with conducting a particular workflow or instance of a workflow, and the ID profile may include identifying information specific to that workflow and/or workflow instance. For example, consider an illustrative scenario involving an automobile accident. An individual involved in the accident, such as a driver, a law enforcement officer, an insurance agent, etc. reporting to the scene of the accident needs to gather identifying information for all parties involved in the accident. In order to do so, the officer launches a workflow (e.g. via an application installed on a mobile device) and captures an image of a driver's license for each individual driver involved in the accident. The image capture operation may include capturing additional image data, including the front and back sides of the driver's license(s), automobile registration card(s), proof(s) of insurance, etc. as would be understood by one having ordinary skill in the art upon reading the present descriptions.

In more approaches, the ID profile may include other types of data in addition to or instead of image data. For example, in some approaches audio data may serve as an ID, e.g. an audio clip comprising an individual's voice corresponding to the entity (e.g. the individual's voice, the voice of a human agent representing a non-human entity, etc.). In this manner, any characteristic of an entity that may serve as a distinguishing criterion (preferably one or more immutable, physical characteristics such as voice, height, visual appearance, gait, fingerprint, identifying marks such as scars, tattoos, barcodes, labels, logos, etc. as would be understood by one having ordinary skill in the art upon reading the present descriptions) for the purposes of ID-based workflows disclosed herein.

In the context of the above exemplary illustration, an ID profile for the workflow may include identifying information for all the various involved parties, such as obtained from various IDs for each driver as described above. The ID profile may optionally include similar identifying information for other individuals pertinent to but not necessarily involved in the accident, such as one or more passengers, witnesses, etc. The workflow may include synthesizing the various identifying information gathered for each pertinent individual (and/or entity) and submitting the information for processing and/or use in the course of the workflow and/or other workflows, which may be independent of or related to the instant workflow conducted in relation to the automobile accident.

For example, in various approaches parallel workflows may be merged into a single workflow for unified processing (e.g. parallel workflows, each workflow corresponding to a driver involved in the accident may be merged for singular or consolidated processing by a single entity, authority, agency, etc. responsible for handling related incidents, such as traffic violation cases, insurance claims, benefits claims, and the like.)

In more approaches, additional workflows may be launched based in part on satisfying one or more trigger conditions in the course of conducting the instant workflow in relation to the automobile accident.

Upon gathering pertinent identifying information, an ID profile, such as may be generated in the course of the workflow by synthesizing the aforementioned identifying information, is synthesized and submitted to a processing center, data repository, etc. The receiving center, repository, etc. may optionally process incoming data submissions, and complete the workflow for which the data were originally submitted or initiate additional workflows (e.g. based on the submitted data and/or result of the workflow for which the data were originally submitted, etc.).

For example, a law enforcement officer reports to the scene of the automobile accident, gathers identifying information for all involved drivers, witnesses, and passengers, synthesizes the identifying information into an ID profile associated with the workflow instance (e.g. via a unique identifier such as a workflow ID), and submits the ID profile for storage and/or further processing.

In some embodiments, processing may include initiating or influencing additional workflows based at least in part on identifying information in the submitted ID profile.

For example, continuing with the automobile accident scenario, upon the law enforcement officer submitting the ID profile in connection with the workflow instantiated in connection with the accident occurrence, the ID profile may be analyzed and a plurality of additional workflows instantiated for one or more individuals, e.g. each driver, identified in the ID profile.

The additional workflows may include, for example, updating driving records to reflect the occurrence of the accident and any charges or violations that may have accrued in connection therewith, beginning a review process before a pertinent transportation authority (e.g. to evaluate or challenge assignment of fines, points, etc.; to initiate an offer to reduce fines, points, etc. by enrolling in traffic education programs, etc. as would be understood by one having ordinary skill in the art upon reading the present descriptions).

In another, similar exemplary scenario, one or more drivers in the automobile accident are charged with a moving violation or other civil or criminal offense. The charges may be issued by a same or similar law enforcement agency that responded to the accident, and it may therefore be useful to leverage identifying information contained in the ID profile that was synthesized in connection with reporting the accident. For example, one of the charged drivers requests trial by jury. In the course of scheduling the associated legal proceedings, it may be useful to contact witnesses, e.g. as may be reflected in the ID profile generated during the accident report workflow conducted by the law enforcement official. Accordingly, in one approach a judicial proceeding associated with a particular accident may utilize ID profile information gathered and/or submitted in connection with the accident.

The judicial proceeding may therefore involve utilizing one or more workflows in order to gather requisite information and/or contact involved parties. For example, in one approach upon receiving a request for trial by jury, a judicial official initiates a workflow configured to schedule hearings. A judicial official engaging the scheduling workflow schedules a hearing date, and dispatches notification of the hearing to all involved parties, e.g. all drivers, passengers and witnesses to the accident. In a particularly preferred approach, the official engaging the scheduling workflow imports the automobile accident workflow ID profile into the scheduling workflow, and based in whole or in part on the imported ID profile the official may dispatch (or initiate a workflow or process for the dispatch of) notifications to each individual informing them of the scheduled hearing date and requesting/ordering their presence accordingly.

Returning now to business workflow integration, in various approaches the ID is integrated into a business workflow in relation to one or more activities or rules of the workflow. The ID may be integrated partially or wholly, i.e. the activity or rule in relation to which the ID is integrated may rely on the entire ID (e.g. the processed image of the ID), part of the ID (e.g. a portion of the processed ID image such as a portion depicting a portrait, unique symbol or identifier), and/or identifying information depicted on the ID. The ID or identifying information may be used directly by the workflow, or may be utilized as part of an intermediate process configured to gather, synthesize, deduce, extrapolate, or otherwise determine information required for the workflow based on the ID or Identifying information, respectively.

Financial Transaction Workflows

In one approach, a business workflow comprises a financial transaction, and the financial transaction relies at least in part on the ID.

As understood herein, a workflow activity, rule, related transaction, etc. "relies" on an ID when the workflow or transaction utilizes part or all of the ID and/or identity information depicted thereon to conduct at least a portion of the workflow or transaction. Various manners in which a workflow may "rely" on an ID are described below with reference to several exemplary implementations.

For example, in one approach a workflow (preferably a workflow comprising a financial transaction) relies on an ID as a form of authentication. The authentication portion of the workflow may include submitting the processed image of the ID, optionally along with metadata associated with the processed image. The processed image of the ID and/or the associated metadata may be compared to corresponding authentication data. Based on the comparison, the progress of the workflow may be influenced, such as by permitting or disallowing the financial transaction.

Advantageously, the financial transaction workflows described herein are not limited to reliance on industry-standard conventions such as MICR characters to accomplish the underlying financial transactions or any of the image processing operations performed on the image data relating to the financial transactions. In this manner, the presently described embodiments are distinct from those described in the relevant art of mobile financial services. Rather, the presently disclosed embodiments, and any equivalents thereof that would be recognized by a skilled artisan reading these descriptions, are configured to capture and process images of various types of IDs under diverse environmental circumstances, and to leverage those ID image data in the course of business workflows comprising one or more financial transactions.

For example, and as will be described in further detail below with respect to the classification and extraction aspects of these disclosures, the present techniques are configured to capture an image of an ID or plural IDs, determine various characteristics of and/or identifying information depicted on the ID, and leverage the determined information in the course of conducting the workflow.

According to the present example of a workflow comprising a financial transaction, the financial transaction may rely at least partially on the ID for authentication purposes, e.g. as a form or source of authentication data.

In various approaches, authentication data may include any data and/or metadata suitable for comparison to the processed image of the ID and/or associated metadata to determine a partial or complete match therebetween. Authentication data may include image(s), such as another image of the ID; another instance of the processed ID image; a portion of the ID image; etc. Authentication data may additionally and/or alternatively include image data descriptive of part or all of the processed ID image, such as the various types of image data utilized in the processing image operation(s) described herein.

Authentication data may still further include identifying information, in some approaches. Authentication data may additionally and/or alternatively include one or more unique identifiers. The unique identifier(s) may optionally be depicted on the ID or a portion of the ID, preferably a portion of the ID depicting unique image data, such as a facial photograph, a hologram, a logo, a watermark, a barcode, etc. or any combination thereof. Alternatively, unique identifiers may be generated, preferably based in whole or in part on identifying data depicted on the ID, based in whole or in part on image data, generated de novo, etc. as would be understood by one having ordinary skill in the art upon reading the present descriptions. In a preferred approach, unique identifiers are generated using an encryption algorithm that accepts as input (e.g. as a seed value) one or more of the aforementioned types of authentication data.

The authentication data may be stored and associated with the processed image for convenient and quick recall in future instances of the workflow and/or other workflows. Conversely, authentication data may be retrieved in conjunction with performing a subsequent instance of the business workflow or another business workflow.

In another approach, a workflow relies on an ID as a source of data. The workflow preferably performs classification and/or extraction as described herein. Utilizing the ID classification, identifying information extracted from the ID, or any other identifying information determined at least partially based on the ID classification and/or extracted data, the workflow may determine requisite data to initiate, participate in, and/or complete one or more workflow activities and/or associated transactions. Exemplary embodiments illustrating various aspects of ID-based classification and extraction will be described in further detail below.

In one exemplary scenario, the business workflow comprises submitting an application for one or more of: financial services, e.g. a loan application, new financial account application (for example a new bank account, investment account, credit line, etc.); a license (for example a license to practice a restricted activity, trade or profession such as a fishing license, driver's license, medical license, teaching license, etc.); a position, e.g. a job application, school application, application for political candidacy, etc.; and an entitlement, (e.g. unemployment, employment benefits, insurance reimbursement or coverage, Social Security, welfare, Medicare/Medicaid, etc.). Moreover, the application process relies at least in part on the ID.

In another illustrative scenario, the business workflow is a financial reporting workflow (e.g. expense reporting, reimbursement request, tax record management/archival, etc.). Moreover, the financial reporting workflow relies at least in part on the ID.

For example, in one approach a financial reporting workflow includes activities and rules configured to facilitate tracking tax-deductible business expenses for a small business owner. The small business owner initiates an expense tracking functionality of the financial reporting workflow, and in connection therewith capture an image of an ID, for example a federal tax employer identification card depicting the business owner's EIN. The small business owner may also or alternatively image a personal ID such as a Social Security card or driver license. The small business owner may also or alternatively image a standard tax form depicting tax information corresponding to the small business and/or the small business owner (e.g. a W-2, 1040, I-9, 940, 941, 944, any state tax form equivalent thereto, etc. as would be understood by one having ordinary skill in the art upon reading the present descriptions) as the ID. Regardless of the particular form of ID, the workflow relies at least in part on the ID to conduct the financial reporting portions thereof.

For example, in one embodiment the small business owner images receipts corresponding to various business expenses incurred throughout the tax year. At the conclusion of the tax year, the small business owner submits the receipt images in conjunction with identifying information needed or useful to the tax return filing process. In at least some approaches, the receipt images may be submitted in conjunction with the processed ID image.

In preferred approaches, the small business owner may utilize the financial reporting workflow to determine eligibility of the various expenses depicted on the imaged receipts. Each expense's eligibility may be determined at least in part using the ID, or identifying information depicted therein. For example, in one approach the workflow determines a business tax profile based at least in part on the ID, and using the business tax profile determines which expenses are likely to be eligible for one or more deductions, credits, or other tax benefit(s).

In a similar approach, a financial reporting workflow includes an expense tracking functionality. The expense reimbursement functionality, rather than being configured for tax purposes, is configured to assist an employee in tracking business-related expenses for reimbursement purposes, such as a teacher or sales representative recording expenses incurred in connection with employment-related activities.

For example, an employee invokes a financial reporting workflows' expense reimbursement functionality, and in the course thereof submits an image of the employee's ID (preferably an employer-issued ID, but including any suitable form of ID). The image may be captured in the course of performing the financial reporting workflow, or retrieved from memory, in various embodiments.

Based in whole or in part on the ID, e.g. on identifying information depicted on the ID such as an employee name, number, etc., the workflow loads an employee profile including reimbursement eligibility information. Utilizing the reimbursement eligibility information, the workflow analyzes one or more expenses submitted by the employee, and determines eligibility of each expense. The employee may then apply for reimbursement of the eligible expenses, or a reimbursement process may be automatically initiated, according to employer preferences and/or policies.

In still yet another exemplary scenario, a business workflow comprises a tracking process (e.g. tracking shipment/delivery of goods or services, tracking of employee performance, tracking customer patronage, etc.) and the tracking process relies at least in part on the ID.

To illustrate, consider various situations involving a provider and intended recipient of goods or services such as a merchant and customer, professional and client, etc. Each of the parties to the exchange possess an ID. The ID is utilized in conjunction with the tracking activity to authenticate the identity of the provider/delivery person and/or the recipient.

For example, in one approach a package is scheduled for delivery. The delivery person may "check in" to the tracking activity upon arrival at the distribution facility, one or more intermediate destinations, and/or the intended recipient's delivery address. The delivery person submits to the workflow an image of an ID, preferably an employee ID, and the image is processed. The processed ID image is stored, e.g. in association with authentication information corresponding to the delivery person.

During a "check in," the employee's unique authentication information, optionally including the ID or identifying information depicted thereon, may be utilized to validate tracking information. For example, a package may be tracked using a unique identifier associated with the package (i.e. a tracking number such as commonly used on shipping labels) according to known methods. The package-level tracking may be verified using the presently described employee-level check in, for example by comparing package tracking data to corresponding check in data, optionally using identifying information corresponding to the delivery person to which the package is assigned, such as may be depicted on an employee ID corresponding to the delivery person.

Accordingly, the "check-in" may optionally include capturing one or more of: an image of the delivery person's ID; an image of the delivered package; an image of the delivery address, etc. as would be understood by one having ordinary skill in the art upon reading the present descriptions. Alternatively, the delivery person may log in to the tracking workflow using a mobile device optionally configured to facilitate tracking the package, e.g. a scanner configured to scan barcodes on shipping labels, a mobile phone or PDA having a camera integrated therewith and configured to track packages using an application and a camera integrated into the mobile phone, PDA, etc.

The "check in" data comprising the ID may be compared against reference information to improve delivery accuracy and reporting. For example, check in data may be compared to chain-of-custody documentation, employer-maintained records, vendor-provided records, etc. In this manner, it is possible for a carrier to verify delivery of the package at the intended address, and for an employer to track and maintain records in association with individual employees, e.g. for performance evaluation purposes.

In related approaches, the ID corresponds to an intended recipient of services, or a candidate in an application process relating to a business workflow. The service or application process involves an appointment, such as in the case of an individual who previously scheduled an appointment for a financial consultation, or an interview for a job. Exemplary appointments relating to business workflows may include any appointment to deliver services, such as legal services, medical services, consultation services, etc. Exemplary appointments may also include interviews, e.g. in connection with an application process, according to additional embodiments. In order to ensure maintenance of an appointment schedule and/or verify presence of all involved parties at the appointed time (particularly the service provider/interviewer/etc. and/or the service recipient/candidate/etc.), a workflow may involve a "check in" process requiring or requesting the intended recipient verify presence and/or identity in connection with the appointment.

In this manner, it is possible for service providers to ensure efficient provision of services, for example by detecting missed appointments, adjusting for scheduling conflicts, etc. Service providers may also desire to track scheduling problems occurring on the service provider's end. For example, providers may desire to track employee performance, to provide incentives to customers, employees, members of a particular private or professional community, organization, etc. or any other equivalent activity benefitting from the use of an ID in the course of a tracking workflow that would be appreciated by a skilled artisan aware of the presently described inventive concepts.

For example, employee performance may be tracked according to average appointment time, number of missed appointments, etc., in various approaches. In more approaches, incentives may include compensation for canceled, late, or rescheduled service occurring because of circumstances under the service provider's control; rewards in response to a customer scheduling and/or timely attending a predetermined number of appointments; etc. as would be understood by one having ordinary skill in the art upon reading the instant disclosures.

Accordingly, the ID may be captured and/or processed in association with performing part or all of the tracking workflow, and the processed ID image is utilized in conjunction with the tracking workflow. The ID may be utilized for authentication purposes, e.g. as a unique identifier by which an employer may track an employee or a customer. The ID may additionally and/or alternatively be utilized as a means of facilitating identification of a pertinent individual to a particular transaction, such as an individual service provider, customer, etc.

For example, in one approach an employer wishes to track customer satisfaction, and in connection with a tracking workflow provides customers an option to submit reviews of service received. The customer may be assisted in identifying the particular individual(s) rendering service by being permitted to review one or more images of various employees, e.g. images of the employee IDs or a portrait depicted on an employee ID. Upon selecting a particular image, the customer may be directed to submit comments, and those comments may be associated with the corresponding employee's performance tracking profile for subsequent use in connection with performance reviews, promotions, etc. as would be understood by one having ordinary skill in the art upon reading the present descriptions.

ID Classification and Workflow Integration

The aforementioned scenarios generally set forth illustrative embodiments of workflows in which the presently disclosed ID-oriented techniques may be applied. It should be appreciated that several of the exemplary workflows may be further facilitated by leveraging additional analysis of the ID, and influencing the progression of the workflow based on the additional analysis.

Optionally, additional ID analysis may include classifying the ID, extracting data from the ID, or both. According to various embodiments, the presently disclosed methods, systems and/or computer program products may utilize and/or include any of the classification and/or data extraction functionalities disclosed in related U.S. patent application Ser. No. 13/802,226, filed Mar. 13, 2013 and Provisional U.S. Patent Application No. 61/780,747, filed Mar. 13, 2013, each of which is herein incorporated by reference.

An exemplary embodiment of ID classification may include conducting part or all of a workflow where an ID may be classified according to several criteria, or at several levels, using one or more separate analyses, in various approaches.

For example, in one approach a multi-level ID classification includes first classifying a document depicted in an image as an ID (e.g. as opposed to other types of document such as a financial document like a check or remittance slip), then classifying the ID as a particular type of ID (e.g. driver's license, credit card, social security card, tax form, passport, military ID, employee ID, insurance card, etc.), then as a member of a particular class of IDs within a type of ID (e.g. Navy, Army or Air Force military ID classes; classes of driver's license organized by distinctions such as commercial/private, or according to state; classes of insurance card by provider, classes of credit card by servicing financial entity or bank; etc.) and so on, as would be understood by one having ordinary skill in the art upon reading the present descriptions.

Some or all of the classification operations may involve separate analyses, or similar analyses, depending on the nature of the classifications and the workflow. In myriad approaches, classification may be performed in an iterative fashion, each iteration preferably classifying the ID according to increasingly specific levels of resolution such as identified in the preceding example for a multi-level ID classification. Accordingly, the presently disclosed classification procedures may, in some approaches, include iteratively classifying a document according to multiple levels of specificity, where each iteration includes determining the document belongs to a particular subclass falling within a broader class to which the document was determined to belong in a prior iteration.

In one generic example, a first iteration may classify a document as an ID. A second iteration may classify the ID as a particular type of ID, e.g. a license. A third iteration may classify the license as a particular type of license, e.g. a driver's license or hunting license. A fourth iteration may classify the type of license according to a still further subclass, such as classifying the driver's license as a commercial driver's license or non-commercial driver's license; similarly a fourth iteration may classify the hunting license according to a type of game or weapon to which the license applies, e.g. a bow-hunting license, a fishing license, etc. A fifth iteration may classify the license even further, e.g. classifying the various types of license determined in the fourth iteration further according to an issuing authority or jurisdiction (typically a state or state agency), e.g. classifying the (non)commercial driver's license as a Maryland (non)commercial driver's license, classifying the bow-hunting license as a Virginia bow-hunting license, etc. as would be understood by one having ordinary skill in the art upon reading the present descriptions.

Moreover, each iterative classification may be based at least in part on a result of the classification determined in a prior operation, e.g. by defining a search space or parameters for use in comparing to the imaged document to perform the classification. Accordingly, in the aforementioned example upon determining a document is an ID, the second iteration may search among a smaller search space (also referred to herein as a search "subspace"), the subspace including only ID subclasses (e.g. driver's license, hunting license, passport, etc.). Similarly, the third iteration may search a space including only driver's license subclasses (e.g. commercial, non-commercial, motorcycle, etc.), and the fourth iteration may search among a space including only subclasses within the previously determined driver's license subclass (e.g. searching among commercial driver's licenses classifications defined by state). A fifth iteration may search among a still smaller space including only a subset of that particular subclass determined in the fourth iteration, e.g. searching among different types of Maryland commercial driver's licenses to determine whether the particular Maryland commercial driver's license is a learner's permit or a full driver's license, whether the particular Maryland commercial driver's license is subject to one or more particular restrictions (e.g. corrective lenses), etc. and may be classified accordingly, such as would be understood by one having ordinary skill in the art upon reading the present descriptions.

It should be further understood that with respect to any given iteration of an iterative classification process, a "subclass" to which an ID is determined to belong in an "$n^{th}$" iteration may be considered the "class" to which the ID is determined to belong for purposes of the "$n+1^{th}$" iteration. Accordingly, in one embodiment of the presently disclosed iterative classification processes, a document is determined to belong to the class "identity document" or "ID" in a first classification iteration. In a second classification iteration, the ID is determined to belong to one of a plurality of ID subclasses, e.g. "driver's license", "passport," etc. In a third iteration, the classification includes determining whether, e.g. the driver's license belongs to one of a plurality of driver's license subclasses, e.g. a driver's license issued by a particular state. In the foregoing example, the class "ID" may be considered a subclass of the broader class of "documents" with respect to the first classification iteration, but considered the broader class with respect to the second classification iteration, i.e. "ID" is a broad class encompassing the various subclasses of ID evaluated in the second classification iteration. Similarly, while "driver's license" is considered a subclass of the "ID" class, for purposes of the third classification iteration described above "driver's license" may be considered a class encompassing the various "state" subclasses.

Accordingly, as referred to herein, the term "subclass" may be understood to encompass a plurality of members sharing at least one common characteristic also common to members of a "class" or "classification" to which the subclass belongs, but which not all members of the subclass exhibit. Put another way, all members of a subclass share a common characteristic that distinguishes each member of the subclass from members of other subclass(es) not exhibiting the common characteristic.

Classification may include defining a plurality of classifications to which a particular ID belongs. The various classifications may have one of several relationships generally referred to herein as either "concentric" "parallel" or "overlapping." According to this general paradigm, and as shown schematically in FIG. 3, a series of classifications are arranged in a hierarchical manner, with each subclass being related to other subclasses as follows.

As demonstrated schematically in FIG. 3, a series 300 of concentric classifications 302, 304, 306, 308 and 310, are considered "concentric," with 302 being broadest and 310 being most narrow. 310 is a subclass of class 308, 308 is a subclass of class 306, 306 is a subclass of class 304, and 304 is a subclass of class 302. Moreover, each and every member of a particular subclass falls completely within the broader definition according to which members of the parent "class" are defined.

Similarly, and again as shown in FIG. 3, classifications 312, 314, 316 and 318 are "parallel." In other words, each of the parallel classifications 312-318 fall within a single broad "parent" class 310, but none of the parallel classifications 312-318 share any definitive characteristics of the respective classifications (i.e. the members of each class may in fact have common features, but for purposes of the particular definitions of each classification, no two features are common among "parallel" classifications—there is no "overlap" between the class definitions).

"Overlapping" classifications are similar to "parallel" classifications, with the exception that members of parallel classifications share at least one common feature and exhibit at least one distinguishing feature with respect to each other. In FIG. 3, classifications 312 and 320 are "overlapping."

Additionally and/or alternatively, the classification may include classifying the ID using multiple individually classified elements of a single ID; e.g. classifying an ID utilizing textual information depicted on the ID, and separately classifying the ID using image data such as a facial photograph also depicted on the ID. Where classification involves use of multiple elements, a classification may be determined for each element, and the classification results may then may then be compared, e.g. for validation purposes, and/or merged to generate an overall classification for the document based on the individual classification results achieved using the individual elements of the single ID.

In at least some approaches, one classification iteration may influence the parameters of a subsequent classification iteration, for example by modifying a list of factors considered in a subsequent operation, a relative contribution of one or more of the factors (e.g. via weighted analyses or computations), a list of eligible or potential classes into which the previously classified object may be further classified, etc.

Moreover, iterative classification may be utilized to improve performance or accuracy of a classification technique, for example improving accuracy by dividing an overall classification process considering a wide variety of factors in a complex computation into a series of simpler computations. In this manner, iterative classification is capable of segregating various members into less ambiguous or unambiguous groups than the overall classification process attempting to consider all factors simultaneously. By reducing the number of classification factors, potential classifications, and/or potential class members considered at each iteration, the classification may be performed using less compute resources, as well as accomplish greater accuracy and/or precision, in multiple embodiments.

Those having ordinary skill in the art will appreciate that reducing the number of factors, classifications, eligible class members, etc. may become detrimental past a certain threshold where the various classes comprise sufficient "overlap" between characteristics of each class that the hierarchy effectively breaks down—all members may be classified according to the class such that classification loses significance (since all members belong). The degree of separation required between various classifications in order to avoid this problematic "lumping" of members into a single class depends upon the nature of the individual members (e.g. how "varied" each member of a class may be, as indicated by a number of unique or distinguishing features of the class compared to other class(es)). Therefore, in some approaches a classification may be trained, tuned, or built so as to avoid iterative classification causing problematic "coarseness" in the classification granularity that may compromise the capability to resolve individual exemplars into various classes using classification as described herein.

Of course, in additional approaches, classification may be utilized in multiple stages of an overall workflow, and may serve a different purpose at each stage of the workflow. In related approaches, particularly where an ID may be classified at multiple "levels" of specificity (e.g. plural "concentric" classifications apply to a particular ID), the various levels of classification may be utilized in multiple stages of an overall workflow.

For example, in one exemplary workflow a user authentication operation may utilize credentials, which may optionally be provided in the form of an image of an employee ID. A user engaged in the workflow may initiate the authentication operation, and capture an image of an ID. The first classification stage of the workflow may include classifying the document depicted in the image as an employee ID based on image data. A subsequent classification stage within the workflow may include classifying the employee ID as an authorized class based on textual information depicted on the ID (e.g. security code, image, etc.).

Classification may be based on any number of ID characteristics, including characteristics of the ID as depicted in the image (and preferably the processed image) such as characteristics suitable for use in computing feature vectors or feature matrices, such as described in related U.S. Patent Publication No. 2014/0270349 (filed as U.S. patent application Ser. No. 13/802,226 on Mar. 13, 2013 and granted as U.S. Pat. No. 9,355,312 on May 31, 2016), which is herein incorporated by reference.

Of course, in other embodiments, different resolutions may be employed without departing from the scope of the present disclosure. For example, classification of larger documents or objects may benefit from utilizing a higher resolution such as 50 pixels by 50 pixels, 100 pixels by 100 pixels, etc. to better represent the larger document or object for robust classification and maximum computational efficiency. The resolution utilized may or may not have the same number of pixels in each dimension. Moreover, the most desirable resolution for classifying various objects within a broad range of object classes may be determined experimentally according to a user's preferred balance between computational efficiency and classification robustness. In still more embodiments, any resolution may be employed, and preferably the resolution is characterized by comprising between 1 pixel and about 1000 pixels in a first dimension, and between 1 and about 1000 pixels in a second dimension.

Figure 10A:
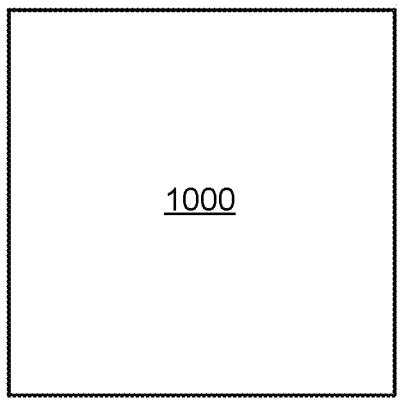
FIG. 10A represents a digital image prior to being divided into sections, according to one embodiment.
Figure 10B:
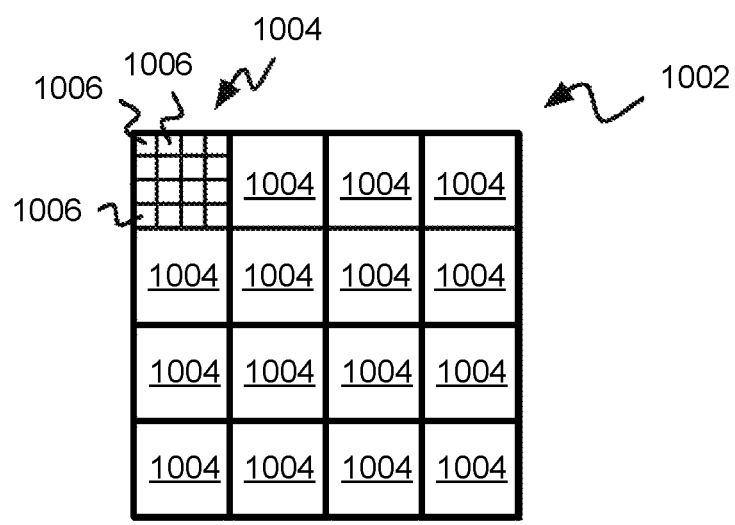
FIG. 10B represents a digital image divided into sections, according to one embodiment.
Figure 10C:
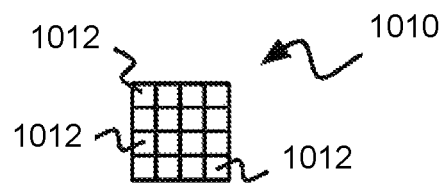
FIG. 10C represents a digital image divided into sections and characterized by a reduced resolution, according to one embodiment.

One exemplary embodiment of inputs, outputs and/or results of a process flow for generating the first representation will now be presented with particular reference to FIGS. 10A-10C, which respectively depict: a digital image before being divided into sections (e.g. digital image 1000 as shown in FIG. 10A); a digital image divided into sections (e.g. sections 1004 as shown in FIG. 10B); and a first representation of the digital image (e.g. representation 1010 as shown in FIG. 10C) characterized by a reduced resolution.

As shown in FIGS. 10A-10B, a digital image 1000 captured by a mobile device may be divided into a plurality of sections 1004. Each section may comprise a plurality of pixels 1006, which may comprise a substantially rectangular grid of pixels such that the section has dimensions of $p_{s(x)}$ horizontal pixels ($p_{s(x)}$=4 as shown in FIG. 10B) by $p_{s(y)}$ vertical pixels ($p_{s(y)}$=4 as shown in FIG. 10B).

In one general embodiment, a first representation may be generated by dividing a digital image R (having a resolution of $x_R$ pixels by $y_R$ pixels) into $S_x$ horizontal sections and $S_y$ vertical sections and thus may be characterized by a reduced resolution r of $S_x$ pixels by $S_y$ pixels. Thus, generating the first representation essentially includes generating a less-granular representation of the digital image.

For example, in one approach the digital image 1000 is divided into S sections, each section 1004 corresponding to one portion of an s-by-s grid 1002. Generating the first representation involves generating a s-pixel-by-s-pixel first representation 1010, where each pixel 1012 in the first representation 1010 corresponds to one of the S sections 1004 of the digital image, and wherein each pixel 1012 is located in a position of the first representation 1010 corresponding to the location of the corresponding section 1004 in the digital image, i.e. the upper-leftmost pixel 1012 in the first representation corresponds to the upper-leftmost section 1004 in the digital image, etc.

Of course, other reduced resolutions may be employed for the first representation, ideally but not necessarily according to limitations and/or features of a mobile device, host device, and or server platform being utilized to carry out the processing, the characteristics of the digital image (resolution, illumination, presence of blur, etc.) and/or characteristics of the object which is to be detected and/or classified (contrast with background, presence of text or other symbols, closeness of fit to a general template, etc.) as would be understood by those having ordinary skill in the art upon reading the present descriptions.

In some approaches, generating the first representation may include one or more alternative and/or additional sub operations, such as dividing the digital image into a plurality of sections. The digital image may be divided into a plurality of sections in any suitable manner, and in one embodiment the digital image is divided into a plurality of rectangular sections. Of course, sections may be characterized by any shape, and in alternative approaches the plurality of sections may or may not represent the entire digital image, may represent an oversampling of some regions of the image, or may represent a single sampling of each pixel depicted in the digital image. In a preferred embodiment, and as shown in FIGS. 10A-10C, the digital image is divided into S substantially square sections 1004 to form an s×s grid 1002.

In further approaches, generating the first representation may also include determining, for each section of the digital image, at least one characteristic value, where each characteristic value corresponds to one or more features descriptive of the section. Within the scope of the present disclosures, any feature that may be expressed as a numerical value is suitable for use in generating the first representation, e.g. an average brightness or intensity (0-255) across each pixel in the section, an average value (0-255) of each color channel of each pixel in the section, such as an average red-channel value, and average green-channel value, and an average blue-channel value for a red-green-blue (RGB) image, etc. as would be understood by one having ordinary skill in the art upon reading the present descriptions.

With continuing reference to FIGS. 10A-10C, in some embodiments each pixel 1012 of the first representation 1010 corresponds to one of the S sections 1004 not only with respect to positional correspondence, but also with respect to feature correspondence. For example, in one approach generating the first representation 1010 may additionally include determining a characteristic section intensity value $i_s$ by calculating the average of the individual intensity values $i_p$ of each pixel 1006 in the section 1004. Then, each pixel 1012 in the first representation 1010 is assigned an intensity value equal to the average intensity value is calculated for the corresponding section 1004 of the digital image 1000. In this manner, the first representation 1010 reflects a less granular, normalized representation of the features depicted in digital image 1000.

Of course, the pixels 1012 comprising the first representation 1010 may be represented using any characteristic value or combination of characteristic values without departing from the scope of the presently disclosed classification methods. Further, characteristic values may be computed and/or determined using any suitable means, such as by random selection of a characteristic value from a distribution of values, by a statistical means or measure, such as an average value, a spread of values, a minimum value, a maximum value, a standard deviation of values, a variance of values, or by any other means that would be known to a skilled artisan upon reading the instant descriptions.

In one operation, a first feature vector is generated based on the first representation.

The first feature vector and/or reference feature matrices may include a plurality of feature vectors, where each feature vector corresponds to a characteristic of a corresponding object class, e.g. a characteristic minimum, maximum, average, etc. brightness in one or more color channels at a particular location (pixel or section), presence of a particular symbol or other reference object at a particular location, dimensions, aspect ratio, pixel density (especially black pixel density, but also pixel density of any other color channel), etc.

As would be understood by one having ordinary skill in the art upon reading the present descriptions, feature vectors suitable for inclusion in first feature vector and/or reference feature matrices comprise any type, number and/or length of feature vectors, such as described in U.S. patent application Ser. No. 12/042,774, filed Mar. 5, 2008; and Ser. No. 12/368,685, filed Feb. 10, 2009 and/or U.S. Pat. No. 7,761,391, granted Jul. 20, 2010 (U.S. patent application Ser. No. 11/752,364, filed May 13, 2007).

In another operation, the first feature vector is compared to a plurality of reference feature matrices.

The comparing operation may be performed according to any suitable vector matrix comparison, such as described in U.S. patent application Ser. No. 12/042,774, filed Mar. 5, 2008; and Ser. No. 12/368,685, filed Feb. 10, 2009 and U.S. Pat. No. 7,761,391, granted Jul. 20, 2010 (U.S. patent application Ser. No. 11/752,364, filed May 13, 2007).

Thus, in such approaches the comparing may include an N-dimensional feature space comparison. In at least one approach, N is greater than 50, but of course, N may be any value sufficiently large to ensure robust classification of objects into a single, correct object class, which those having ordinary skill in the art reading the present descriptions will appreciate to vary according to many factors, such as the complexity of the object, the similarity or distinctness between object classes, the number of object classes, etc.

As understood herein, "objects" include any tangible thing represented in an image and which may be described according to at least one unique characteristic such as color, size, dimensions, shape, texture, or representative feature(s) as would be understood by one having ordinary skill in the art upon reading the present descriptions. Additionally, objects include or classified according to at least one unique combination of such characteristics. For example, in various embodiments objects may include but are in no way limited to persons, animals, vehicles, buildings, landmarks, documents, furniture, plants, etc. as would be understood by one having ordinary skill in the art upon reading the present descriptions.

For example, in one embodiment where attempting to classify an object depicted in a digital image as one of only a small number of object classes (e.g. 3-5 object classes), each object class being characterized by a significant number of starkly distinguishing features or feature vectors (e.g. each object class corresponding to an object or object(s) characterized by very different size, shape, color profile and/or color scheme and easily distinguishable reference symbols positioned in unique locations on each object class, etc.), a relatively low value of N may be sufficiently large to ensure robust classification.

On the other hand, where attempting to classify an object depicted in a digital image as one of a large number of object classes (e.g. 30 or more object classes), and each object class is characterized by a significant number of similar features or feature vectors, and only a few distinguishing features or feature vectors, a relatively high value of N may be preferable to ensure robust classification. Similarly, the value of N is preferably chosen or determined such that the classification is not only robust, but also computationally efficient; i.e. the classification process(es) introduce only minimal processing overhead to the device(s) or system(s) utilized to perform the classification algorithm.

The value of N that achieves the desired balance between classification robustness and processing overhead will depend on many factors such as described above and others that would be appreciated by one having ordinary skill in the art upon reading the present descriptions. Moreover, determining the appropriate value of N to achieve the desired balance may be accomplished using any known method or equivalent thereof as understood by a skilled artisan upon reading the instant disclosures.

In a concrete implementation, directed to classifying driver licenses according to state and distinguishing driver licenses from myriad other document types, it was determined that a 625-dimensional comparison (N=625) provided a preferably robust classification without introducing unsatisfactorily high overhead to processing performed using a variety of current-generation mobile devices.

In a classifying operation, an object depicted in the digital image is classified as a member of a particular object class based at least in part on the comparing operation. More specifically, the comparing operation may involve evaluating each feature vector of each reference feature matrix, or alternatively evaluating a plurality of feature matrices for objects belonging to a particular object class, and identifying a hyper-plane in the N-dimensional feature space that separates the feature vectors of one reference feature matrix from the feature vectors of other reference feature matrices. In this manner, the classification algorithm defines concrete hyper-plane boundaries between object classes, and may assign an unknown object to a particular object class based on similarity of feature vectors to the particular object class and/or dissimilarity to other reference feature matrix profiles.

In the simplest example of such feature-space discrimination, imagining a two-dimensional feature space with one feature plotted along the ordinate axis and another feature plotted along the abscissa, objects belonging to one particular class may be characterized by feature vectors having a distribution of values clustered in the lower-right portion of the feature space, while another class of objects may be characterized by feature vectors exhibiting a distribution of values clustered in the upper-left portion of the feature space, and the classification algorithm may distinguish between the two by identifying a line between each cluster separating the feature space into two classes—"upper left" and "lower-right." Of course, as the number of dimensions considered in the feature space increases, the complexity of the classification grows rapidly, but also provides significant improvements to classification robustness, as will be appreciated by one having ordinary skill in the art upon reading the present descriptions.

Figure 6:
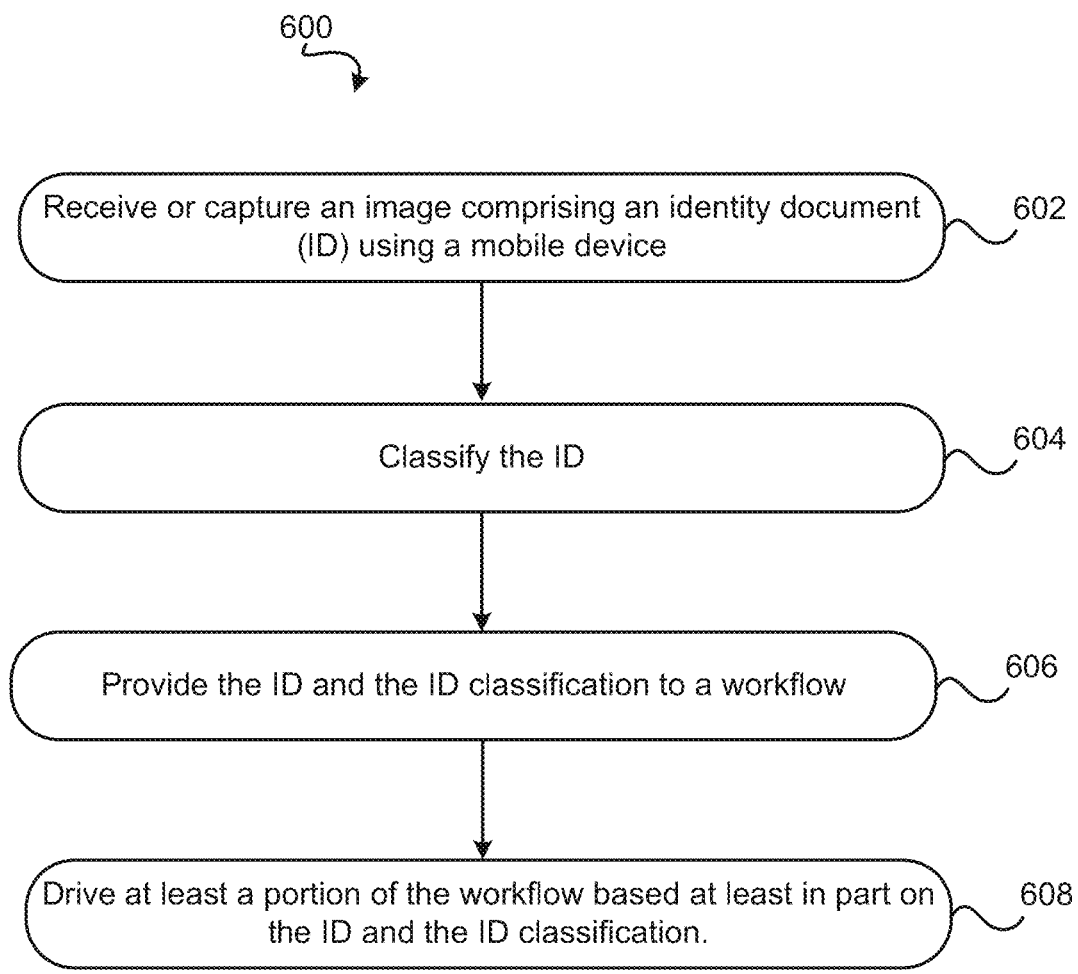
FIG. 6 is a flowchart of a method, according to one embodiment.

Referring still to the Figures, FIG. 6 depicts a method 600 generally illustrating the overall inventive process of integrating ID classification techniques and/or mobile implementations thereof into business workflows, according to one embodiment. The method 600 may be practiced in any environment, using any number of suitable resources, such as depicted in FIGS. 1-3, among others.

The method 600 includes operation 602, where an image comprising an ID is received or captured, preferably using a mobile device.

The method 600 also includes operation 604, in which the ID is classified. The classification may take any form such as described herein, but preferably the classifying is based at least in part on comparing feature vector data. The comparison may include comparing feature vector(s) to reference feature vector(s), a reference feature matrix or matrices, and/or by performing any number of pre-comparison analyses, computations, operations, or transformations of the feature vector (e.g. in one approach feature vectors may be subjected to a weighting process, and the resulting products compared rather than comparing the feature vectors per se). In more approaches, the presently disclosed techniques may leverage support vector machines (SVMs) or SVM techniques to generate, describe, manipulate, etc. feature vectors and/or matrices.

In operation 606, method 600 includes providing the ID and the ID classification to a workflow, preferably a workflow also instantiated on the mobile device and/or executable at least in part using the mobile device. The ID and ID classification may be provided to the workflow in any suitable manner, e.g. by storing one or more of the ID and the ID classification to memory and associating the corresponding memory locations with the workflow, by communicating with a remote data storage system storing the ID and/or ID classification, via another workflow or another operation within a same workflow, etc. as would be understood by skilled artisans reading these descriptions.

With continuing reference to FIG. 6, method 600 includes operation 608, where at least a portion of the workflow is driven based at least in part on the ID and the ID classification. Preferably, the workflow is driven based on identifying information represented in the ID and/or determined using identifying information or other information (e.g. an ID identifier) obtained from the ID. The workflow is even more preferably also driven based on the ID classification, e.g. determining select workflows from among a plurality of workflows to which the ID classification relates, pertains, or is applicable.

In various embodiments, driving the workflow may include directing the workflow down one of several potential alternative paths, influencing an outcome of a workflow activity, influencing a workflow rule, defining a workflow activity and/or rule, etc. as would be understood by one having ordinary skill in the art upon reading the present descriptions.

In some approaches, method 600 may optionally include one or more alternative and/or additional features, functions or operations, such as described herein.

For example, in one embodiment a method 600 processes an image to identify a plurality of documents depicted therein, and preferably to identify each ID among the plurality of additional documents. Even more preferably, this embodiment of method 600 may include classifying each identified ID and analyzing each classified ID based in whole or in part on the classification thereof.

Figure 7:
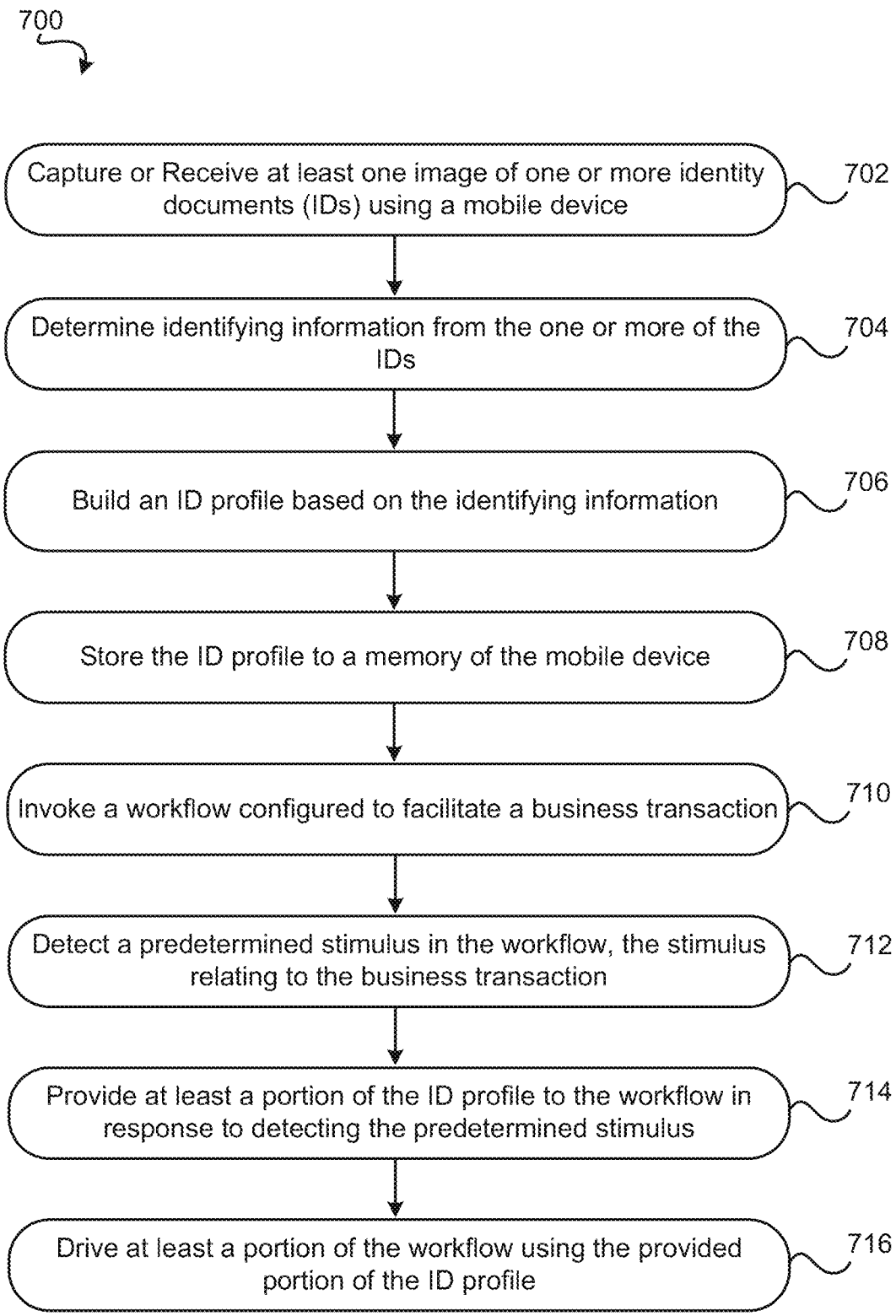
FIG. 7 is a flowchart of a method, according to one embodiment.

Referring again to the Figures, and having now set forth the various definitions relevant to the presently disclosed concepts, a general ID Classification workflow integration includes operations such as set forth in method 700 as depicted in FIG. 7, according to one embodiment. The method 700 may be practiced in any environment, using any number of suitable resources, such as depicted in FIGS. 1-3, among others.

The method 700 includes operation 702, where at least one image comprising an ID or multiple IDs is received or captured, preferably using a mobile device.

The method 700 also includes operation 704, in which identifying information is determined from at least one of the IDs. The identifying information may be determined from the ID(s) directly, e.g. using an OCR operation or the like, using a lookup operation, e.g. as described herein with respect to ID identifiers and the capacity thereof to serve as a "key" to which identifying information may be a value or values in a relational database or other similar data structure, in some approaches. Of course, identifying information may be determined from the ID(s) in any suitable manner without departing from the scope of the instant disclosures.

In operation 706, method 700 includes building an ID profile based on the identifying information determined previously. For example, while building an ID profile may include any suitable manner of combining, associating, relating or describing plural pieces of identifying information. Preferably, the ID profile is built in a manner such that the identifying information are assembled in a context-dependent or context-sensitive manner (e.g. associating plural pieces of identifying information all relevant to a particular type of transaction, workflow activity, business process, etc. as would be understood by one having ordinary skill in the art upon reading the present descriptions). The ID profile may include any type of identifying information as well as other information relevant to one or more portions of a workflow. Moreover, in various embodiments ID profiles may be built in a manner to be specific to a particular entity, e.g. an ID profile may relate exclusively to a plurality of human individuals authorized to act as agents on behalf of a corporate entity, relate to a single human individual, etc.

With continuing reference to FIG. 7, method 700 includes operation 708, where the ID profile is stored to a memory, preferably a memory of the mobile device. The ID profile may be stored in any suitable format, and is preferably stored in association with at least one workflow or workflow component (e.g. activity, rule, tool, operation, etc.) to which the ID profile relates. Even more preferably, the ID profile is stored in a manner sufficient to facilitate facile location, recall, and/or use of the information contained therein in any number of workflows capable of being performed in whole or in part using the mobile device. For example, in one approach an ID profile may be stored in association with metadata that comprises one or more identifiers corresponding to the workflow(s) or workflow component(s) to which the ID profile relates. Those workflows may optionally invoke the relevant ID profile or portions thereof by using the metadata, in some approaches.

Method 700 further includes an operation 710 where a workflow configured to facilitate a business transaction is invoked. Workflows, as understood herein, may facilitate business transactions in any suitable manner, e.g. by providing essential information upon which the business transaction relies (e.g. financial information corresponding to one or more parties to a financial transaction; medical information requisite to a medical diagnosis or a referral requisite to scheduling a medical appointment; etc. as would be understood by one having ordinary skill in the art upon reading the present descriptions. Moreover, the workflow is preferably invoked in association with the ID, ID profile, and/or identifying information relating thereto.

In operation 712, method 700 includes detecting a predetermined stimulus in the workflow. The stimulus relates to the business transaction, and preferably the stimulus includes an indication, request, requirement, operation, calculation, etc. reflecting how the workflow relies upon, requires, or would otherwise benefit from particular knowledge, preferably knowledge comprising identifying information such as depicted on or otherwise associated with IDs as described herein.

For example, a predetermined stimulus in the context of a workflow configured to facilitate a financial transaction may include attempting an operation relying on an entity's financial information (e.g. a name, account number, routing number, security code, address, etc.), and/or displaying a user interface comprising one or more fields relating to requiring or configured to receive, store, etc. an entity's financial information.

In another example, a workflow configured to facilitate a tracking operation may include predetermined stimuli such as invoking one or more predetermined user interfaces or workflow operations, e.g. a "login" or authentication interface may indicate initiation of a situation to which the tracking operation applies (e.g. a delivery person logs in to a tracking application and scans packages upon receipt/pickup) while a "logout" or checkout interface may indicate termination of the situation to which the tracking operation applies, arrival at or completion of an intermediate destination, checkpoint, etc.; as would be understood by one having ordinary skill in the art upon reading the present descriptions.

In operation 714, at least partially in response to detecting the predetermined stimulus, some or all of the ID profile information is provided to the workflow. The portion of the ID profile information provided to the workflow may include identifying information and/or other information, and preferably the portion of the ID profile provided to the workflow also relates to the predetermined stimulus. For example, a preferred scenario would include a workflow configured to process a financial transaction relying on an entity's checking account number and routing number. The workflow comprises a user interface having fields for the checking and account number. The workflow is also associated with one or more ID profiles including account and checking numbers for one or more entities. In response to presenting the user interface having the account/routing number fields, the workflow is provided the account and/or routing number from an ID profile corresponding to an entity engaging the workflow (e.g. as may be indicated by a prior authentication interface wherein a user authorized to act as an agent on behalf of a corporate entity, and/or a user acting on their own capacity "logged" in to the workflow).

In operation 716, accordingly, at least a portion of the workflow is driven using the provided portion of the ID profile. Again according to the above account/routing number example, the workflow may process an associated financial transaction using the account and/or routing number. Of course any other suitable form of "driving" the workflow as described herein may also be utilized in operation 716 without departing from the scope of the presently described embodiments.

In additional approaches, the method(s) 600 and/or 700 may include one or more additional and/or alternative operations and/or functionalities such as described in further detail below with respect to various exemplary embodiments.

In one approach, classification may be based in whole or in part on techniques such as disclosed in related U.S. application Ser. No. 13/802,226. Particularly preferred are techniques utilizing feature vectors, reference feature matrices, and feature vector comparison as disclosed therein.

In additional approaches, ID classification may include performing one or more iterative classification operations, each iteration preferably comprising classifying the ID according to more specific categories or classes which may be subsumed by a generic class, classification, or category.

For example, in one approach ID classification may comprise a plurality of classification operations. In a first classification, an image depicting a document is classified, and the document depicted in the image is classified as an ID.

In a second classification, the ID is subjected to additional classification, and the ID is classified according to one of a plurality of ID categories, such as categorizing IDs according to the intended use or application therefor, including financial IDs, medical IDs, employment IDs, permit IDs, etc. and/or according to an ID type, such as driver's license, passport, hunting permit, employee ID card, Social Security card, etc. as would be understood by one having ordinary skill in the art upon reading the present descriptions.

In a third and/or subsequent classification, the ID may be still further classified according to one of a plurality of classes within a particular ID category and/or ID type, such as described above. In principle the ID may be classified according to any number of criteria, and may be classified according to an iterative approach further refining the ID classification according to the particular needs of a downstream workflow relying in whole or in part on the ID and/or identifying information depicted therein.

For example, in one implementation a workflow includes receiving an image of a document, and processing the image. The processed image is subjected to a classification operation, which determines whether the document is or should be classified as an ID. Upon determining the document classification is "ID," the workflow may include further classifying the ID, e.g. classifying the ID as a license. Additional classifications may include determining the ID is a vehicular license (e.g. as opposed to a hunting license, fishing license, professional license, etc.) In similar approaches, the vehicular license may be classified according to the activity, administrative entity, or body of law pertaining to the license, such as classifying vehicular licenses as one or more of a driver's license, a commercial driver's license, a non-commercial driver's license, a pilot's license, a boating license, etc.; and may be still further classified according to a type of vehicle to which the license applies, such as motorcycles, non-commercial vehicles, commercial vehicles, automobiles, locomotives, watercraft, aircraft, etc. as would be understood by one having ordinary skill in the art upon considering the instant disclosures.

In more embodiments, the exemplary ID classification process may include determining the ID corresponds to one among a plurality of ID types relating to the ID classification. ID types preferably include a plurality of useful categories into which the ID class is subdivided. More preferably, the types are defined with respect to applicability to downstream business process integration and/or workflow performance. For example, illustrative types according to various embodiment may include separating classes of driver licenses by state, insurance documents by provider, financial documents by bank or financial institution, financial documents by servicing/processing entity (e.g. VISA, AMEX, etc.)), passports by country, immigration documents by country of national origin and/or issuing country/authority, etc. as would be understood by one having ordinary skill in the art upon reading the present descriptions.

In more approaches, the classification techniques and/or workflows leveraging ID classification may involve associating one or more of the ID classification(s) with the image of the ID. Preferably, the association is or reflects a data-metadata relationship, e.g. between the image data and the classification of the ID depicted in the image data. More preferably, both the data and metadata are stored to a local memory component, such as a memory of a mobile phone. Even more preferably, the data and/or metadata are stored in a manner so as to permit ease of access and utilization by one or more workflows. For example, the data and/or metadata may be stored in a format compatible with the workflow and/or software associated with the workflow (especially image processing software). In such approaches, exemplary inventive concepts described herein may include associating various data with other data or processes, e.g. workflow operations, etc. For example, in one embodiment the image depicting the ID may be associated with a classification to which the ID is determined to belong. Optionally, but preferably, the classification is associated with the image as metadata tag(s) applied to the image data.

However, in some approaches only one of the data and metadata are stored, e.g. in the case of a workflow that relies on the image data only for classification purposes, or has no further use for the image data after performing a successful classification thereof. In other embodiments, a workflow may include determining a classification of an ID depicted in the image data, and discarding the image data upon determining the classification. In this manner, it may be possible to process image data once, determine classification information pertaining thereto, and subsequently store and utilize the classification information without having to retain the image data.

In still more embodiments, it may be advantageous to perform optical character recognition (OCR) based at least in part on the classification and/or result of classification. Specifically, it may be advantageous to determine information about the location, format, and/or content of text depicted in objects belonging to a particular class, and modify predictions estimated by traditional OCR methods based on an expected text location, format and/or content. For example, in one embodiment where an OCR prediction estimates text in a region corresponding to a "date" field of a document reads "Jan. 14, 2011" the presently disclosed algorithms may determine the expected format for this text follows a format such as "[Abbreviated Month][.] [##] [,] [####]" the algorithm may correct the erroneous OCR predictions, e.g. converting the comma after "Jan" into a period and/or converting the letter "1" at the end of 2011" into a numerical one character. Similarly, the presently disclosed algorithms may determine the expected format for the same text is instead "[##]/[##]/[####]" and convert "Jan" to "01" and convert each set of comma-space characters "," into a slash "/" to correct the erroneous OCR predictions.

In even more approaches, the presently disclosed classification techniques may additionally and/or alternatively include performing classification on image data including depiction(s) of plural documents. The depictions may be present in a single image, plural images, video data, etc. and may include depictions of IDs and documents other than IDs, as well as a plurality of each type of document, in various approaches. Regardless of the number and type of documents depicted in the image data, classification thereof includes processing the image(s) to identify one or more of the IDs among the plurality of documents depicted in the image(s); and classifying each of the identified IDs.

Embodiments leveraging plural documents, and particularly plural IDs, benefit from the advantageous capability to synthesize an identity profile that may include more identifying information than necessary to engage in a particular workflow or associated transaction, but which is also accordingly applicable to a broader range of workflows or transactions than the particular workflow or associated transaction requiring only the subset of the identifying information.

An identity profile may be synthesized in any suitable manner, according to various approaches. For example, in one embodiment an identity profile is synthesized utilizing identifying information determined from the IDs, utilizing non-identifying information determined from the IDs, and/or utilizing identifying information determined at least in part based on the ID (e.g. utilizing identifying and/or non-identifying information from an ID or set of IDs to look up identifying information requisite for a workflow but not depicted on that particular ID or set of IDs), utilizing metadata stored in association with an ID or set of IDs (e.g. where the metadata comprises identifying information, and/or where the metadata may be utilized in a similar manner as described above to look up associated identifying information requisite for the workflow), etc. as would be understood by one having ordinary skill in the art upon reading the present descriptions.

In still more approaches, classification may include analyzing each of the classified IDs to determine at least some identifying information therefrom. Preferably, the identifying information is determined in the course of the analysis based at least in part on the ID classification.

Even more preferably, the identity profile is synthesized from identifying information determined from at least two of the classified IDs, and each of the at least two classified IDs comprising the identifying information may be utilized as a tool for purposes of cross-verification, e.g. to ensure consistency and/or accuracy of the information included in the corresponding identity profile.

In any event, regardless of the technique utilized to synthesize a given identity profile, (e.g. from one or more IDs and optionally including one or more sources of identifying information other than IDs), at least some of the identifying information from the identity profile is utilized in the course of the business workflow. Accordingly, identifying information from the identity profile may be submitted to the business workflow, in one embodiment.

In still more embodiments, analyzing classified IDs may include utilizing an ID classification to determine identifying information depicted on the ID. For example, in one embodiment an ID is classified, and, based in whole or in part on the classification, a template corresponding to the classification is determined. The template may include instructions for locating and/or identifying various types of information depicted on an ID, especially identifying information, in preferred approaches. The templates contemplated herein may include any suitable form of instructions for locating and/or identifying various types of identifying information, such as would be apparent to one having ordinary skill in the art upon being apprised of these disclosures.

For example, in one approach a template includes instructions providing an absolute location of identifying information depicted on an ID, such as coordinate information corresponding to a range of pixels depicting the identifying information. In other approaches, a template includes providing a relative location of identifying information depicted on an ID. The template may include instructions and/or knowledge that two particular types of identifying information are consistently located within close physical proximity on the ID, and/or with a particular relative arrangement of the identifying information, such as various identifying information being arranged vertically or horizontally adjacent other information, identifying information being arranged on a same or an opposite face, side, edge or corner of the ID with respect to other information, etc. as would be understood by one having ordinary skill in the art upon reading the present descriptions.

In another embodiment, a workflow may leverage classification as a filter to effectively reduce computational cost of downstream operations in the workflow. For example, in one approach a workflow includes retrieving one or more records corresponding to an entity, and using those records in the course of the workflow to reduce downstream processing. Illustrative examples may include a workflow involving a credit check, a background check, a driving record review, etc. as would be understood by one having ordinary skill in the art upon reading the present descriptions.

In one embodiment, a workflow classifies an ID such as a driver's license. Based on classifying the ID as a driver's license issued by a particular state, downstream operations, e.g. retrieving associated driving records, financial records, criminal records, etc. may be facilitated by reducing the search space within which the workflow must search for the associated records. For example, by determining an ID is a Maryland driver's license, subsequent retrieval records may search a database storing records for only Maryland residents rather than a database storing records for all U.S. residents.

The aforementioned variety of classification-based search-space reduction may also be leveraged to great advantage in conjunction with data extraction techniques described in further detail below. For example, extracted data may be compared against a relatively small or narrow search space based on a classification of the document from which the data were extracted, in a manner similar to the above-described scenarios.

The classification may be utilized in the course of conducting an associated business workflow, in preferred approaches. For example, in one embodiment a business workflow additionally includes performing the classification in response to detecting a predetermined stimulus in a business workflow.

In more embodiments, the ID and/or ID classification may be validated, using similar techniques such as described above.

ID Data Extraction and Workflow Integration

Generally speaking, ID Data Extraction as discussed herein may include any features such as disclosed in related Provisional U.S. Patent Application No. 61/780,747, filed Mar. 13, 2013, which is herein incorporated by reference.

Moreover, according to preferred embodiments, the data extraction techniques disclosed herein are combined with one or more of the previously disclosed ID business workflow integration techniques and/or ID classification techniques. For example, in particularly preferred embodiments data extraction is based at least in part on the ID classification. Even more preferred, the integration of identifying information and/or the extracted data into the associated business workflow may be based at least in part on the ID classification.

Figure 8:
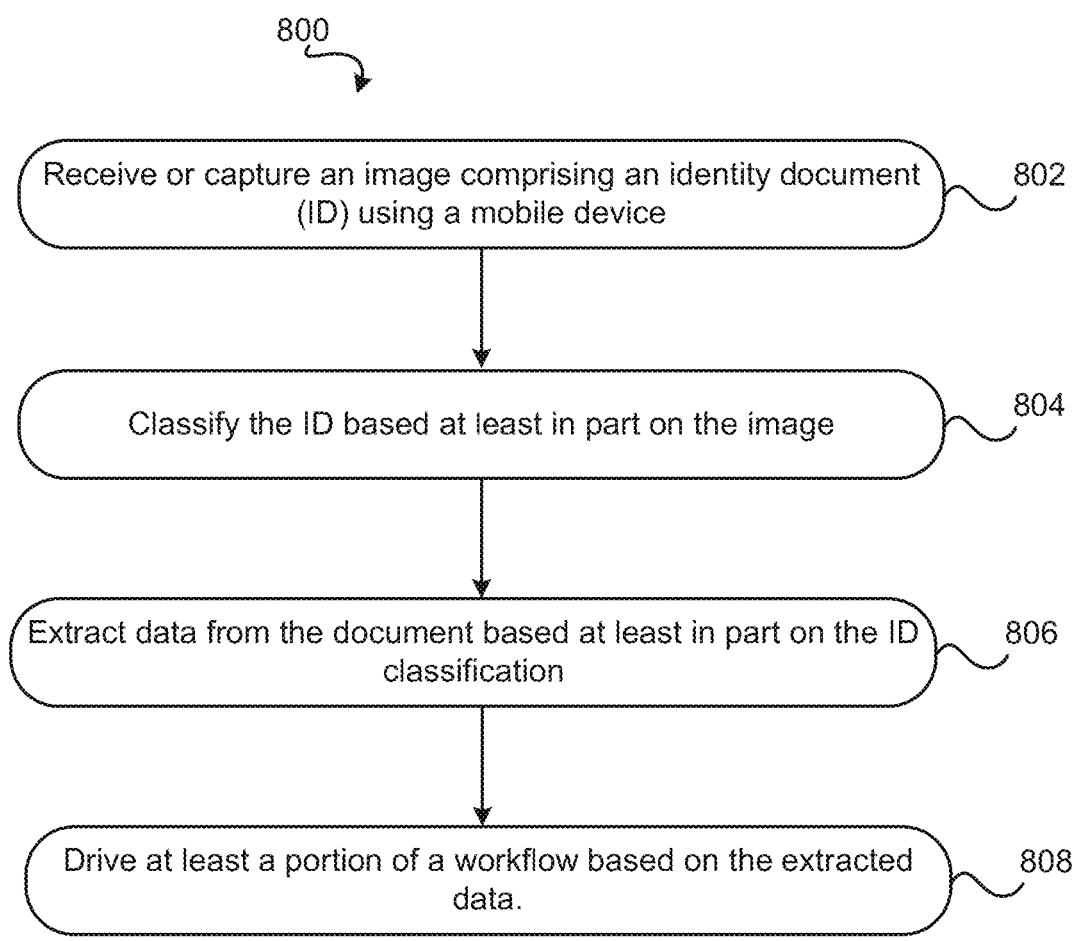
FIG. 8 is a flowchart of a method, according to one embodiment.

Referring still to the Figures, FIG. 8 depicts a method 800 generally illustrating the overall inventive process of integrating ID data extraction techniques and/or mobile implementations thereof into business workflows, according to one embodiment. The method 800 may be practiced in any environment, using any number of suitable resources, such as depicted in FIGS. 1-2, among others.

The method 800 includes operation 802, where an image comprising an ID is received or captured using a mobile device.

The method 800 also includes operation 804, in which the ID is classified based at least in part on the image. Classification may be performed in any suitable manner as described herein within the context of method 800, in various approaches.

In operation 806, method 800 includes extracting data from the ID based at least in part on the ID classification. For example, in one approach extracting data may include building an extraction model based in whole or in part on the ID classification, and extracting the data from the ID using the extraction model. Extraction models may include any feature, function, or detail as described herein and/or in the related applications referenced above without departing from the scope of the present disclosures.

With continuing reference to FIG. 8, method 800 includes operation 808, where at least a portion of the workflow is driven at least partially based on the extracted data.

Referring again to the familiar example of a workflow configured to facilitate a financial transaction, in one approach a workflow may receive an image of an ID comprising a credit card or debit card. The workflow may classify the ID as the appropriate type of card, and may further classify the card type according to one or more additional distinguishing features (e.g. financial servicer such as VISA, American Express, Discover, MasterCard, etc.). Based on the card's classification, an extraction model is built.

In some approaches, the extraction model may describe statistical properties of distribution of one or more features of the ID, e.g. a distribution of text fields across the ID, a distribution of image elements (such as photograph, state seal, hologram, etc.), a distribution of lines, borders, boxes, or other delimiters depicted in the ID, etc. as would be understood by one having ordinary skill in the art upon reading the present descriptions.

In other embodiments, the extraction model precisely defines a region of the ID where data that would enable or facilitate the financial transaction are located, as well as optimal parameters to extract those data from the ID. Using the extraction model, an account number, security code, accountholder name, expiration date, etc. may be extracted from the ID with high accuracy and fidelity, e.g. using a custom-tailored OCR operation, object recognition operation, facial recognition operation, pattern recognition operation, etc. as would be understood by one having ordinary skill in the art upon reading the present descriptions. The extracted data may then be provided to the workflow, and utilized to drive the workflow, e.g. by completing the financial transaction according to the aforementioned exemplary scenario.

Figure 9:
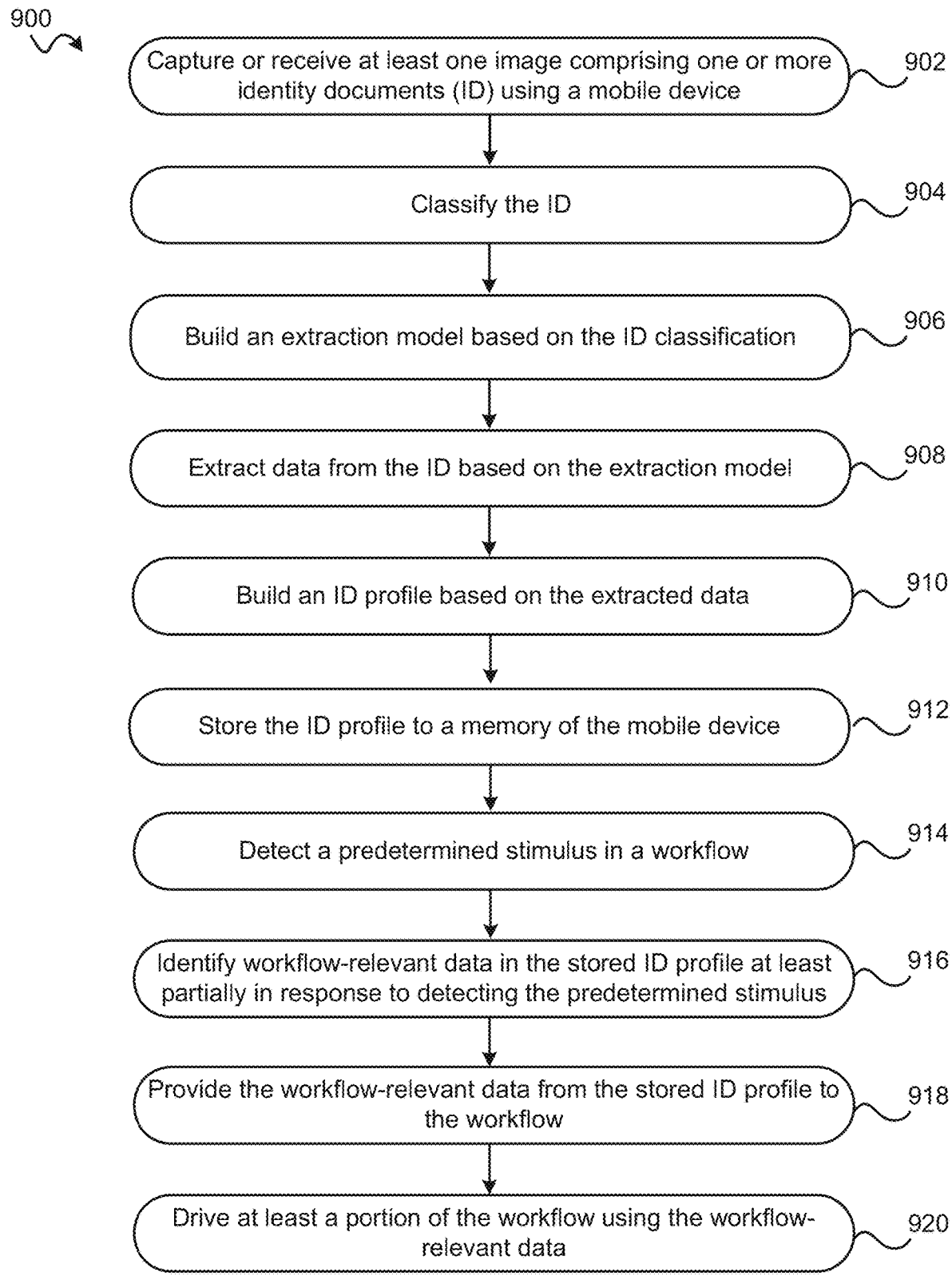
FIG. 9 is a flowchart of a method, according to one embodiment.

Referring again to the Figures, a more specific ID data extraction workflow integration includes operations such as set forth in method 900 as depicted in FIG. 9, according to one embodiment. The method 900 may be practiced in any environment, using any number of suitable resources, such as depicted in FIGS. 1-3, among others.

In a preferred approach, the data extraction is performed and fully capable of operation without any reliance whatsoever on textual data or textual information generated/determined in the course of performing traditional OCR. For example, even in embodiments where extraction may optionally leverage OCR techniques, those embodiments exclude the capability to determine, leverage, or in any way utilize the textual information determined thereby, instead using only positional information from the OCR process. In this manner, data extraction may be considered to exclude OCR techniques that are capable of/configured to determine textual information, and instead to utilize, if any, only OCR techniques configured to determine positional information.

In preferred embodiments, the method 900 includes operations 902-908 which are substantially similar to the operations 802-808 described above with reference to FIG. 8. In particular, in operation 902 at least one image comprising one or more IDs is received or captured using a mobile device. In operation 904, the ID(s) are classified. In operation 906 an extraction model based on the ID classification(s) is built. In operation 908, data are extracted from the ID based on the extraction model.

In particularly preferred embodiments, the extraction model may be built based on previously collected and/or analyzed data, and assigned to the classification to which the ID is also determined to belong. In this approach, upon determining an ID corresponds to a particular classification, the associated extraction model may be selected, imported, loaded, applied, etc. and generally utilized to extract data as described herein.

In embodiments where the image or images depicting the ID(s) (and/or multiple pages of a single multi-page ID) comprises multiple documents, method 900 may optionally involve classifying multiple of the ID documents or multiple elements of a single ID (e.g. classifying each page of a multi-page ID, or multiple elements of a single page such as a photograph and a text string). A prototypical example of a multi-paged ID is any form of ID that includes a front and back side, e.g. a driver's license, credit or debit card, etc. Other prototypical multi-paged IDs may include passports, financial statements, medical records, etc. as described herein and would be understood by a skilled artisan reading said descriptions.

The classification of each document, page, element, etc. may be compared to the classification of other document(s), page(s), element(s), etc., and based in whole or in part on the comparison, an overall classification of the ID(s) may be determined. Similarly, an extraction model may be built based on any number of the classification(s) of the various documents, pages, elements, etc.

With continuing reference to FIG. 9, method 900 also includes additional operations not specified with respect to FIG. 8 and method 800. For example, as shown in FIG. 9, method 900 includes an operation 910, where an ID profile is built based on the extracted data. In some approaches, the ID profile may be built based on additional information beyond the extracted data, preferably additional identifying information that may be determined in whole or in part using the extracted data, e.g. via a lookup operation or based on presence of the same or similar information in other images, workflows, operations, etc. optionally associated with the ID profile. As noted above, the ID profile may correspond to a single entity, plural entities, a particular business process or transaction, a particular workflow, etc. as would be understood by one having ordinary skill in the art upon reading the present descriptions.

Similarly, any number of identity sub-profiles may be synthesized based at least in part on the extracted data. For example, continuing with the scenario where multiple human agents are authorized to act on behalf of an entity, while the ID profile may correspond to the entity, each sub-profile synthesized therefrom may correspond to a single one of the human agents. Identity sub-profiles may additionally and/or alternatively be resolved with respect to association, relevance, pertinence, etc. of identifying information contained therein to a particular type of workflow, business process, transaction, etc. in more approaches.

Method 900 also includes operation 912, in preferred approaches. More specifically, operation 912 includes storing the built ID profile to memory, preferably a memory of the mobile device utilized to receive and/or capture image(s) in operation 902. The ID profile may be stored to volatile memory in embodiments where identifying information therefrom is relevant to or otherwise utilized in connection with a particular instance of a workflow, preferably the instance of the workflow where at least one image from which the data were extracted was received or captured.

In more approaches, the method 900 includes operation 914 where a predetermined stimulus of a workflow is detected. Suitable stimuli, and detection thereof, may include any suitable form or type as described herein, in the related disclosures incorporated by reference, and/or as would be understood by a skilled artisan upon reading this and said related disclosures.

In still more approaches, method 900 includes operation 916. Preferably, the operation 916 includes identifying workflow-relevant data from a stored ID profile in response to detecting the predetermined stimulus in operation 914. Data may be identified and determined to be workflow-relevant in a single operation or in a series of operations, in various approaches.

In one approach, the determination of workflow-relevancy comprises comparing the identified data to other workflow data, and/or comparing one or more characteristics of the identified data to characteristics of other workflow data (e.g. formatting, presence or absence of indicative symbols or patterns, such as a dollar sign, numeral sign, etc. in a string of text, or similar image data characteristics of portions of an ID depicting a photograph, logo, emblem, etc.). and determining the identified data are workflow-relevant based on similarity between the identified data and the other workflow data as determined from the comparison. Of course, other techniques for determining data are "relevant" to a workflow may be employed without departing from the scope of the present disclosures.

However, in preferred approaches, semantic context of extracted data with respect to workflow relevancy is determined previous to conducting the workflow, and the corresponding classification, extraction, etc. may leverage this a priori knowledge to improve efficiency and accuracy of the classification, extraction, etc.

In one embodiment, method 900 also includes operation 918, wherein the data determined to be workflow-relevant are provided to the workflow to which the data were determined to be relevant. Preferably, the workflow-relevant data are provided from the stored ID profile directly to the workflow, e.g. by "loading" the relevant data into the workflow, associating the relevant data with the workflow (e.g. using metadata or file pointers/references, etc.), or any other suitable form of providing the workflow access to the information in the stored ID profile, such as would be appreciated by skilled artisans reading these descriptions.

In other approaches, data may be determined to be workflow-relevant based on a classification of the ID from which the data were extracted. For example, in some approaches where an underlying transaction, operation, etc. relies on a standard form of identification (e.g. a driver's license for a background check, entitlement application, job application, etc.) and a workflow classifies an ID as being one of the acceptable (standard) form(s) of identification relied upon for that underlying process, then the data extracted from the ID may be determined to be workflow-relevant based on the ID classification (solely or in combination with other factor(s), in myriad approaches).

In preferred approaches, method 900 encompasses additional operation 920, where a portion of the workflow is driven using the workflow-relevant data. The workflow may be driven in any suitable fashion such as would be understood by a skilled artisan reading the present descriptions.

In various approaches, the presently disclosed ID data extraction techniques may be leveraged to great advantage in the course of conducting a wide variety of business workflows. For example, in a general approach an ID is imaged, optionally using a capture component of a mobile device. The ID image is processed, again preferably at least partially using a mobile device processor, but also including processing performed by any suitable or available processing resources. The processed ID image is subjected to a classification analysis, which determines that the document is indeed an ID, and preferably determines that the ID belongs to one or more classifications. The classifications may include nested (sub)classifications falling within the scope of a broader classification, such as described above and as would be understood by one having ordinary skill in the art upon reading the present descriptions.

For example, continuing with the ID scenario discussed above, the classification analysis may determine the image depicts an ID, and the ID belongs to the class "license," the subclass "vehicular license," the further subclass "driver's license" and a still further subclass corresponding to a particular state, e.g. a "Maryland driver's license."

Based on one or more of the classifications, exclusively or in combination with any number of other factors such as various characteristics of the image, an extraction model may be selected or built corresponding to the class of documents (IDs) to which the imaged ID belongs. Data extraction techniques and extraction models are described in further detail in related U.S. Provisional Application 61/780, 747, filed Mar. 13, 2013, which is herein incorporated by reference. Using the extraction model, data are extracted from the ID for subsequent use in connection with a business workflow.

For example, in one approach a business workflow may be invoked based in whole or in part on the extracted data.

In more approaches, a workflow progression may be dictated or influenced based in whole or in part on the extracted data. For example, in one embodiment a user engages a workflow to purchase, register for, schedule, etc. provision of one or more services, such as a service to deliver goods, a consultation service, etc. The user, in the course of the workflow, is prompted to capture an image of their driver's license and submit the image to the workflow. The driver's license depicts the user's name, date of birth, address, and other identifying information. The ID is classified, and based on the ID being classified as a driver's license, an extraction model is built (and/or retrieved) and utilized to extract data from the driver's license.

In still more approaches, the extracted data forming the basis for the workflow influence may do so based on association with other data not necessarily depicted on the ID. For example, continuing with the driver's license scenario described above, assume the user is applying for renewal of a driver's license as the particular service purchased, scheduled, etc. The workflow may extract data including the driver's license number, in some approaches.

Utilizing the driver's license number, optionally in combination with other extracted data such as the user's name, etc. a workflow may detect that a particular license is associated with one or more holds on the renewal process (e.g. outstanding fees, fines, tickets, points, judgments, restrictions, or other types of hold such as would be understood by one having ordinary skill in the art upon reading the present descriptions). For example, the workflow may communicate with one or more databases, systems, records, etc. such as those maintained by the local department of motor vehicles (DMV) or motor vehicle administration (MVA), e.g. to track licensed drivers in the corresponding locality. Although the ID does not indicate anything about the driver's license having associated therewith one or more holds, using the data extracted from the driver's license the workflow is able to determine the associated hold information and direct the progress of the workflow accordingly.

In one illustrative approach, the aforementioned workflow may invoke a renewal interface and/or initiate a renewal transaction in response to determining no holds are associated with a particular driver's license. Conversely, the workflow may invoke any number of interfaces to assist a user in resolving or lifting any hold determined to be associated with a particular driver's license. For example, in one embodiment the workflow invokes a fee payment submission interface to resolve fee-related holds in response to determining the license has associated therewith an outstanding balance. The workflow may facilitate the driver submitting any requisite payment without having to initiate a separate payment process, e.g. by logging in to an appropriate website, mailing a check with an appropriate form, etc. as would be understood by one having ordinary skill in the art upon reading the present descriptions.

In another embodiment, the workflow may invoke a driver education or traffic school program application process, e.g. in response to determining the license has associated therewith one or more holds relating to traffic violations, such as points on a driver's license. Similarly, the workflow may invoke an appropriate payment interface and/or traffic school application interface in response to determining a judgment applies to the driver, requiring the driver complete traffic school prior to resuming driving activity.

In another exemplary embodiment, a user is engaged in a financial transaction workflow, for example to submit a state or federal tax return. The workflow includes capturing or otherwise providing an image of an ID, such as a driver's license, tax form such as a W-2, etc. The workflow preferably leverages the captured image data as a source of pertinent identifying information for the tax return preparation. In one approach, the workflow includes determining whether an individual taxpayer (i.e. entity) must pay a particular tax associated with engaging in a particular activity or failing to engage in a particular activity. The determination may be made either directly from identifying information extracted from and/or depicted on the ID or based on using the identifying information to retrieve associated information, such as in a lookup process. In response to determining the entity must pay the tax based on that entity's (non)engagement in the associated activity, the workflow may invoke an interface presenting the entity with an opportunity to modify behavior and avoid paying the tax in future years.

In a concrete example, a user interacting with a workflow to prepare federal tax return submits an image of an ID such as a driver's license and/or images of tax forms to the workflow. The workflow includes classifying the ID(s) in the image(s), extracting tax-pertinent data therefrom, and populating appropriate fields of the tax return with the appropriate extracted data. In addition, the workflow is configured to facilitate users minimizing a required tax payment. As a result, the workflow is configured to recommend, offer and/or facilitate engaging potential tax-saving strategies available to the user.

In the foregoing scenario, a user is a student or is self-employed, and accordingly lacks health insurance. As a result, the user must pay a health care tax, which may be determined by the workflow based at least in part on the user submitting (or failing to submit) one or more forms of ID, including a driver's license and, preferably, medical information. For example, the user may fail to submit documentation requisite to provide proof of insurance to avoid the health care tax. Alternatively and/or additionally, the workflow may rely on one or more external sources of data regarding tax-related activity.

In one approach, the IRS maintains a database reflecting health care enrollment status, or each health care provider maintains enrollment data available to customers to provide proof of insurance for tax purposes. Based on data extracted from the user's ID, the workflow may interface with the source(s) of data and determine whether an individual is enrolled in a qualifying health insurance program, and provide proof thereof to the appropriate entity for taxation purposes. If the user is not enrolled in a qualifying health insurance program, the workflow may, rather than providing the proof of insurance information to the tax return, invoke a health insurance enrollment interface designed to facilitate the user purchasing one or more qualifying health insurance program policies, and accordingly avoiding the health care tax in future years.

Of course, other exemplary scenarios such as described above with reference to classification and ID processing may be leveraged with equal applicability to the presently disclosed data extraction concepts and features. Any type of data that may be obtained from an ID and utilized singly or in combination (e.g. as a "seed" or query to determine, locate, discover, compute, or otherwise obtain additional information relating to the workflow, another workflow, or most preferably a business process underlying the workflow) in the course of a workflow to determine, influence, modify, direct or accomplish, etc. one or more activities, rules, or business processes relating to the workflow should be understood as included within the scope of the instant disclosures.

Exemplary forms of data suitable for extraction according to the presently described techniques and which may be useful to various workflows include strings, e.g. a string of alphanumeric characters and/or symbols; images, particularly images depicting a photograph of a person or property such as a vehicle, a unique image such as a security image, etc.

Similarly, in another embodiment a user wishes to conduct a financial transaction such as depositing funds into a bank account, submitting payment for a purchase, etc. via a workflow. The workflow receives an image of a document, and as described above classifies the document as an ID. The financial transaction may require one or more proofs of identity, such as a name, address, etc. Alternatively the user may simply wish to provide requisite data by capturing an image depicting the data, rather than manually entering the data.

For any number of reasons, the user captures and/or submits an image of an ID to the workflow. The workflow processes the image, classifies any documents (and preferably any IDs) depicted therein, and builds an extraction model based on the classification. The data are extracted, and based at least in part on the extracted data, the workflow may progress in any number of context-dependent manners.

For example, in one approach a user's submitted ID depicts an address differing from an address of record associated with the user's financial account. In response to determining the discrepancy, the workflow may invoke an interface configured to facilitate the user updating their address, either in records associated with the user's financial account, or by requesting a change of address be submitted/performed with respect to the imaged ID.

In a similar approach, a user may be engaged in a purchase, and submit an ID or utilize data extracted from an ID in the course of the purchase. For example, a user may designate a desired form of payment to complete the transaction, but the transaction may not be capable of proceeding using the desired form of payment, e.g. because that form of payment may be unacceptable by the vendor, the associated account has insufficient funds, the form of payment (e.g. credit/debit card) has expired, etc. as would be understood by one having ordinary skill in the art upon reading the present descriptions.

In response to determining the desired form of payment cannot be utilized in the present transaction, the workflow may invoke a number of potential interfaces, activities, or new workflows. For example, in one approach where the form of payment is unacceptable by the vendor (e.g. vendor does not accept a particular form of payment such as a check, or a payment from a particular servicer such as American Express, etc.) the workflow may utilize data extracted from the ID to locate one or more alternative forms of payment.

Alternate forms of payment may be associated with a user profile accessible to the workflow, and the profile located based on identifying information depicted on the ID and used in connection with the profile (e.g. the user's name). Alternate forms of payment may additionally and/or alternatively be determined by the workflow using the extracted data to locate additional financial resources available to the user, according to any available procedure and using any available data source such as would be understood by one having ordinary skill in the art upon reading the present descriptions. Regardless of the manner in which the workflow utilizes the extracted data to locate and/or determine eligibility of the alternate form of payment, the workflow may provide an indication to the user that the desired form of payment is unacceptable by the vendor. The workflow may alternatively or additionally suggest one or more of the alternate form(s) of payment be used to complete the transaction, request and receive user input designating one of the alternate forms of payment, and complete the transaction using the designated alternate form of payment.

In another embodiment, similar to that above, the workflow may determine that a form of payment being offered to complete a financial transaction is expired. As a result, the workflow may utilize data extracted from the ID to locate corresponding financial records, e.g. in an associated workflow profile such as described above and/or located externally to the workflow but capable of being determined using the data extracted from the ID.

Of course, as will be understood by skilled artisans reading the present descriptions, user input may be requested, received, and or utilized in the course of a workflow without respect to detecting any particular problem with the workflow or underlying data. Indeed, it may be advantageous in some approaches to request user input as a matter of course, e.g. in order to validate accuracy of workflow-critical data (e.g. as extracted from an image), to provide workflow security (e.g. CAPTCHA-variety human authentication, etc. as would be understood by skilled artisans reading these descriptions). Accordingly, user input may be solicited, received, and/or incorporated into workflows as described herein using any suitable technique without departing from the scope of the instant disclosure. Preferably, user input is received via a mobile device, and even more preferably via a display of the mobile device.

Preferably, the workflow is configured to interface with a financial institution managing a user's financial account(s) corresponding to the expired form of payment, and to present the user with an interface configured to facilitate requesting renewal of the form of payment, or alternatively issuance of a new form of payment to replace the expired form of payment. Even more preferably, the workflow may suggest an alternate form of payment relying on a similar or same source of funding as the expired form of payment, e.g. the workflow may suggest the user submit an electronic transfer of funds from the same account corresponding to the expired debit card previously offered to attempt completing the financial transaction.

Data extraction may also be performed at least partially in response to detecting one or more predetermined conditions or workflow stimuli. In one embodiment, data extraction occurs in response to determining that the document is an ID, and depicts information relating to a business workflow. In this manner, the extraction operation may be invoked in response to detecting an ID and/or workflow-relevant data on an ID, such as may be indicated by the ID classification, in some approaches.

Regarding performing page detection based on classification, it may be advantageous in some approaches to utilize information known about an object belonging to a particular object class in order to improve object detection capabilities. For example, and as would be appreciated by one having ordinary skill in the art, it may be less computationally expensive, and/or may result in a higher-confidence or higher-quality result to narrow a set of characteristics that may potentially identify an object in a digital image to one or a few discrete, known characteristics, and simply search for those characteristic(s).

Exemplary characteristics that may be utilized to improve object detection may include characteristics such as object dimensions, object shape, object color, one or more reference features of the object class (such as reference symbols positioned in a known location of a document).

In another approach, object detection may be improved based on the one or more known characteristics by facilitating an object detection algorithm distinguishing regions of the digital image depicting the object from regions of the digital image depicting other objects, image background, artifacts, etc. as would be understood by one having ordinary skill in the art upon reading the present descriptions. For example, if objects belonging to a particular object class are known to exhibit a particular color profile or scheme, it may be simpler and/or more reliable to attempt detecting the particular color profile or scheme within the digital image rather than detecting a transition from one color profile or scheme (e.g. a background color profile or scheme) to another color profile or scheme (e.g. the object color profile or scheme), especially if the two colors profiles or schemes are not characterized by sharply contrasting features.

In various embodiments, a plurality of IDs may be submitted in the course of one or more workflows, and in association with each workflow, or with any number of the workflows, an identity profile may be synthesized at least partially based on data extracted from one or more of the plurality of IDs. The identity profile may comprise a plurality of sub-profiles. Preferably, the plurality of sub-profiles are each configured to serve as a source of identifying information generally required by a particular type of business process, e.g. a financial identity information profile, a medical identity information profile, an employment identity information profile, etc. as would be understood by one having ordinary skill in the art upon reading the present descriptions.

The identity profiles may be maintained in storage on a mobile device, or remotely from the mobile device, and retrieved via secure communication protocols as required by the user's activity in the various associated business workflows. Preferably, the identity profiles may be stored in conjunction with one or more images from which the identity profile information was synthesized. Either the identity profile data or the image data may be stored in association with the other, e.g. as metadata, in particularly preferred approaches. In even more embodiments, stored and/or retrieved identity profile data may be verified in the course of the workflow, in association with retrieving the identity profile data, etc. as would be understood by one having ordinary skill in the art upon reading the present descriptions. Verification may include any suitable form of confirmation that the ID profile is secure—e.g. password authentication, encryption, etc. Verification may also involve leveraging one or more computational tools to determine whether data in the ID profile have been tampered with. For example, verification may in one approach comprise calculating a hash sum (or checksum) of an ID profile, and storing the calculated hash value in association with the ID profile. In order to ensure the ID profile remains unchanged since a last authorized user access, a hash sum for the stored ID profile is calculated prior to retrieval. If the hash sum calculated prior to retrieval is identical to the hash sum calculated and/or associated with the stored ID profile, then the ID profile is unchanged, and the data thereof verified, in one embodiment.

In preferred approaches, the any of the foregoing exemplary workflows are performed at least partially using a mobile device, and in particularly preferred approaches using a mobile application running on the mobile device. Accordingly, the exemplary workflows ideally are performed in combination with capturing an image of the ID using the mobile device, either as part of the workflow or as an additional operation taken in conjunction with the workflow process.

In even more preferred embodiments of any of the foregoing scenarios, the ID (and/or any useful information associated therewith, depicted thereon, or determined therefrom) is submitted to the workflow via a mobile application running on the mobile device. In this manner it is possible to encapsulate the user's entire interaction with the workflow on the mobile device, maximizing convenience for the user and flexibility of the overall workflow process. Of course, the entire workflow need not occur on or utilize data stored on or accessible to the user or the user's mobile device (or other device from which the ID is submitted). The presently described scenarios also encompass situations where, for example, a user may prepare some data for submission to a backend server or system for additional processing, by automated systems, humans, or some combination thereof.

The presently disclosed inventive concepts may also be embodied as a system. For example, in one such embodiment a system includes a processor and logic. The logic is in and/or executable by the processor, and configured to cause the processor to perform one or more operations in response to invocation and/or execution thereof.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising a hardware processor and logic executable by the hardware processor to cause the hardware processor to perform operations comprising: receiving an image comprising an identity document (ID); analyzing the image to identify a plurality of image features; detecting the ID within the image based on one or more of the plurality of image features, wherein the detecting comprises directly detecting, within the digital image, a color profile corresponding to the ID rather than detecting, within the digital image, a transition from a first color profile to a second color profile; building a feature vector comprising a matrix, wherein the identified plurality of image features upon which the feature vector is based correspond to a photographic or pictorial portion of the ID rather than textual information depicted on the D, and wherein building the feature vector comprises: dividing the image into a plurality of sections; analyzing pixels within each section to determine at least one characteristic value of one or more of the identified plurality of image features in the plurality of sections, wherein the at least one characteristic value comprises an average intensity of the pixels in the section of the image; and storing a plurality of the characteristic values of the identified plurality of image features in the feature vector; classifying the image as a particular type of ID based on the feature vector; processing the image to generate data comprising: identifying information from the ID; and/or a portion of the image depicting the ID generating a first representation of the image based at least in part on the at least one characteristic value determined for each section, wherein each pixel of the first representation corresponds to one of the sections into which the image was divided, wherein the first representation is characterized by a resolution less than a resolution of the image; comparing the feature vector to at least one reference feature matrix, wherein each reference feature matrix corresponds to one of a plurality of classes of ID including the particular type of ID; building an ID profile based at least in part on the data; storing the ID profile to a memory; verifying the ID profile, wherein verifying the ID profile comprises: calculating a hash sum of the ID profile; and comparing the calculated hash sum with a hash sum stored in association with the ID profile; and wherein the ID profile comprises: an ID identifier for the ID; one or more additional ID identifiers, each of the one or more additional ID identifiers each independently corresponding to one or more additional IDs; the identifying information from the ID; and additional identifying information from the one or more additional IDs, wherein the identifying information from the ID corresponds to a first individual, wherein the additional identifying information corresponds to at least one additional individual, and wherein the first individual and the at least one additional individual are each characterized by being involved in a single event or transaction, and wherein the identified plurality of image features further comprise: a pattern depicted on the ID, wherein the pattern comprises: a distribution of one or more boxes depicted in the ID; a shape of an object depicted on the ID; and a color profile of the photographic or pictorial portion of the ID; wherein determining classifying the image as the particular type of ID comprises a support-vector machine technique; wherein classifying the image as the particular type of ID comprises an iterative classification process, wherein each iteration of the iterative classification process is performed using a smaller search space than previous iterations of the iterative classification process; wherein each iteration of the iterative classification process seeks to classify the image according to a smaller, refined subset of subclasses belonging to a larger class of the ID as determined in a previous iteration of the iterative classification process; and wherein the image is a digital image comprising a plurality of pixels.

* * * * *

UNITED STATES PATENT AND TRADEMARK OFFICE
CERTIFICATE OF CORRECTION

| | | |
|---|---|---|
| PATENT NO. | : 11,321,772 B2 | Page 1 of 1 |
| APPLICATION NO. | : 15/394731 | |
| DATED | : May 3, 2022 | |
| INVENTOR(S) | : Jan W. Amtrup et al. | |

It is certified that error appears in the above-identified patent and that said Letters Patent is hereby corrected as shown below:

In the Claims

At Column 49, Claim number 1, Line number 47, please replace:
"information depicted on the D, and wherein"
With:
--information depicted on the ID, and wherein--.

Signed and Sealed this
Fifteenth Day of August, 2023

*Katherine Kelly Vidal*

Katherine Kelly Vidal
*Director of the United States Patent and Trademark Office*